(12) United States Patent
Ishida et al.

(10) Patent No.: US 7,201,997 B2
(45) Date of Patent: Apr. 10, 2007

(54) NON-AQUEOUS ELECTROLYTE BATTERY

(75) Inventors: Sumihito Ishida, Mino (JP); Keisuke Tanaka, Suita (JP); Hideo Kaiya, Moriguchi (JP); Shoichiro Watanabe, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 321 days.

(21) Appl. No.: 10/240,809

(22) PCT Filed: Dec. 25, 2001

(86) PCT No.: PCT/JP01/11405

§ 371 (c)(1),
(2), (4) Date: Oct. 4, 2002

(87) PCT Pub. No.: WO02/054525

PCT Pub. Date: Jul. 11, 2002

(65) Prior Publication Data

US 2003/0134190 A1    Jul. 17, 2003

(51) Int. Cl.
*H01M 6/12* (2006.01)
*H01M 6/46* (2006.01)

(52) U.S. Cl. .................. 429/162; 429/136; 429/300
(58) Field of Classification Search ............. 429/136, 429/162, 300, 142
See application file for complete search history.

(56) References Cited

U.S. PATENT DOCUMENTS

| | | | | |
|---|---|---|---|---|
| 5,688,293 A * | 11/1997 | Oliver et al. | ............. | 29/623.1 |
| 5,705,292 A * | 1/1998 | Yukita et al. | ............. | 429/137 |
| 6,423,447 B1 * | 7/2002 | Ohsaki et al. | ............. | 429/217 |
| 6,531,246 B2 * | 3/2003 | Hanafusa et al. | ............. | 429/162 |

FOREIGN PATENT DOCUMENTS

| | | |
|---|---|---|
| JP | 11-265699 A | 9/1999 |
| JP | 2000-012084 A | 1/2000 |
| JP | 2000-067850 A | 3/2000 |
| JP | 2000-156209 A | 6/2000 |
| JP | 2000-208168 A | 7/2000 |
| JP | 2000-223090 A | 8/2000 |
| JP | 2000-223108 A | 8/2000 |
| JP | 2001-357825 A | 12/2001 |
| WO | WO 95/31836 A1 | 11/1995 |

* cited by examiner

Primary Examiner—Patrick Joseph Ryan
Assistant Examiner—Julian Mercado
(74) Attorney, Agent, or Firm—Akin Gump Strauss Hauer & Feld LLP

(57) ABSTRACT

Disclosed is a non-aqueous electrolyte battery comprising: a flat outer jacket comprising a metal sheet and having two primary flat portions facing each other; two active material layers of a first polarity respectively carried on inner surfaces of the flat portions; an electrode plate of a second polarity disposed in a position facing with each of the active material layers; and a separator layer interposed between each of the active material layers and the electrode plate of a second polarity, with the outer jacket serving as a current collector of the active material layers.

9 Claims, 10 Drawing Sheets

NON-AQUEOUS ELECTROLYTE BATTERY

CROSS-REFERENCE TO RELATED APPLICATION

This application is a 371 of International Application No. PCT/JP01/11405, filed Dec. 25, 2001, the disclosure of which is incorporated herein by reference.

TECHNICAL FIELD

The present invention relates to a non-aqueous electrolyte battery and the method of producing the same.

BACKGROUND ART

Recently, an increasing number of electronic equipment such as AV equipment and personal computers are becoming cordless and portable. With this development, many non-aqueous electrolyte batteries with high energy density containing a non-aqueous electrolyte, are being adopted. Of the non-aqueous electrolyte batteries, lithium secondary batteries are the ones that are most widely used in practical applications.

For the negative electrode of the lithium secondary battery, negative electrode materials capable of absorbing and desorbing lithium as well as having a low electric potential closer to that of lithium, such as graphite and amorphous carbon, are being employed. On the other hand, for the positive electrode, for example, lithium-containing transition metal compounds capable of absorbing and desorbing lithium as well as having a high electric potential, such as $LiCoO_2$ and $LiMn_2O_4$, are being employed as the positive electrode material.

The electrode plate of the non-aqueous electrolyte battery is produced, for example, in the following manner.

Firstly, a slurry-like electrode mixture which contains a positive electrode material or a negative electrode material, a binder and a dispersion medium, is prepared. The electrode mixture is applied onto a current collector or a core material such as a metal sheet, metal mesh, metal lath sheet and punched metal, which is then rolled, dried and cut into a desired shape to give an electrode plate.

The non-aqueous electrolyte is prepared by dissolving a lithium salt such as $LiPF_6$ or $LiBF_4$ in a non-aqueous solvent. As the non-aqueous solvent, for example, ethylene carbonate, dimethyl carbonate, ethyl methyl carbonate, propylene carbonate, diethyl carbonate and the like are employed. These days, a mixed solvent of an open-chain compound and a cyclic compound is in great use.

A conventional non-aqueous electrolyte battery comprises, for example, an electrode plate group, which is produced by spirally winding a positive electrode and a negative electrode with a separator disposed therebetween, and a cylindrical-type or square-type container for housing the electrode plate group together with a non-aqueous electrolyte. The opening of the container is sealed by a sealing plate which also serves as an external terminal. A battery having such structure is difficult to be designed thinner. However, with the recent trend for more compact electronic equipment, there is a strong demand for a small, light-weight battery with a sufficient energy density which can be accommodated in a limited space. Even batteries with a thickness of less than several millimeters are demanded in many cases.

For this reason, polymer electrolytes are recently being applied to batteries. As a polymer electrolyte, a gel electrolyte is employed, which comprises a liquid non-aqueous electrolyte and a polymer retaining the same. The polymer electrolyte has both functions of transferring ions and separating electrode plates. Thin polymer batteries with high energy density have also been developed, which are fabricated by stacking a positive electrode and a negative electrode with a separator layer containing the polymer electrolyte disposed therebetween and covering the whole by an outer jacket.

The separator layer containing the polymer electrolyte is formed, for example, by causing a microporous membrane or non-woven fabric each containing a gel-forming agent to absorb a liquid non-aqueous electrolyte and sandwiching it between electrode plates. As the gel-forming agent, a polymer capable of absorbing a liquid non-aqueous electrolyte and forming a gel electrolyte, is employed.

A separator layer composed only of a polymer electrolyte can also be formed. Examples of the method of forming such separator include the one which involves mixing a gel-forming agent and a solvent to prepare a paste, stacking electrode plates with the paste interposed therebetween and drying the whole, followed by causing the gel-forming agent to absorb the liquid non-aqueous electrolyte. Additionally, another method is known, which involves mixing a gel-forming agent and a liquid non-aqueous electrolyte to prepare a paste and stacking electrode plates with the paste interposed therebetween.

Japanese Unexamined Patent Publication No. 2000-67850 discloses a technique of integrating electrode plates with a separator layer comprising a polymer electrolyte interposed therebetween.

In each of Japanese Unexamined Patent Publication Nos. 2000-12084, 2000-156209 and 2000-223108, there is disclosed an electrode plate group, formed by disposing a pair of electrode plates which comprises a pair of current collectors and an active material layer formed on one surface of each of the current collector so as to face each other with the active material layers disposed facing inwardly, and sandwiching an electrode plate of a different polarity by the pair of the electrode plates with a separator layer comprising a polymer electrolyte interposed therebetween. There is also disclosed a battery in which an electrode plate group is accommodated in an outer jacket made of a laminate sheet comprising a resin layer and a metal foil.

Japanese Unexamined Patent Publication No. Hei 11-265699 discloses a battery in which an electrode plate group having a separator layer comprising a polymer electrolyte is accommodated in a bag-like, film-type outer jacket provided with a safety venting mechanism.

Japanese Examined Patent Publication No. Hei 9-506208 discloses a battery in which a flat, spirally wound electrode plate group having a separator layer comprising a polymer electrolyte is accommodated in an envelope-like outer jacket having an external terminal.

In each of the conventional thin batteries described above, the electrode plate group is accommodated in an outer jacket which is separately prepared. There is a limit on the simplification of the outer jacket structure, the reduction in thickness and improvement in energy density of the battery, and the simplification of the battery manufacturing process, as long as these are attempted based upon the idea of using a separately prepared outer jacket.

DISCLOSURE OF INVENTION

It is an object of the present invention to provide a light-weight, high-energy density, thin non-aqueous electrolyte battery which has a high flexibility in capacity design and a simplified outer jacket structure. In particular, it is an object of the present invention to provide a thin non-aqueous electrolyte battery having a novel structure in which the battery thickness and battery area have been reduced.

It is also an object of the present invention to provide an efficient method of producing a non-aqueous electrolyte battery, which method allows a series of steps to be performed continuously without the need to perform an outer-packing or sheathing step.

Namely, the present invention relates to a non-aqueous electrolyte battery comprising:

an outer jacket comprising a metal sheet and having two primary flat portions facing each other;

two active material layers of a first polarity respectively carried on inner surfaces of the flat portions;

an electrode plate of a second polarity disposed in a position facing with each of the active material layers; and a separator layer interposed between each of the active material layers and the electrode plate of a second polarity, the outer jacket serving as a current collector of the active material layers.

The present invention also relates to the non-aqueous electrolyte battery in a double-stacked form, comprising: an additional electrode plate of a first polarity disposed adjacent to the electrode plate of a second polarity with a separator layer interposed therebetween; and an additional electrode plate of a second polarity disposed adjacent to the additional electrode plate of a first polarity with a separator layer interposed therebetween.

Further, the present invention relates to a non-aqueous electrolyte battery comprising a lead electrically connected to the electrode plate of a second polarity, one end of the lead protruding outside from the outer jacket, and the lead being insulated from the outer jacket with resin.

It is preferable that the lead is provided with an overcurrent breaking device sealed with resin at a portion thereof sandwiched between the peripheral portions of the outer jacket.

It is preferable that at least one of the separator layer and the active material layers contain a polymer electrolyte.

It is preferable that the polymer electrolyte is a gel electrolyte comprising a liquid non-aqueous electrolyte and a polymer retaining the same.

Further, the present invention relates to a non-aqueous electrolyte battery wherein the outer jacket comprises a pair of metal sheets having flat portions facing each other or a single metal sheet folded so as to have two flat portions facing each other, and peripheral portions facing each other of the pair of metal sheets or peripheral portions facing each other of the single metal sheet are joined.

It is preferable that the peripheral portions facing each other are joined by laser welding or ultrasonic welding.

It is preferable that the metal sheet has a thickness of 10 to 100 μm.

The present invention also relates to a method of producing a non-aqueous electrolyte battery comprising the steps of:

(1a) forming an active material layer of a first polarity on a flat portion of one surface of a metal sheet except for a peripheral portion thereof, thereby producing an outer electrode plate;

(2a) producing an electrode plate of a second polarity;

(3a) preparing a pair of outer electrode plates, disposing one of the outer electrode plates and the other outer electrode plate so as to face each other, with the active material layers disposed facing inwardly, and sandwiching the electrode plate of a second polarity by the pair of outer electrode plates facing each other, with a separator layer interposed therebetween; and (4a) joining peripheral portions of the pair of outer electrode plates facing each other.

Further, the present invention relates to the method of producing a non-aqueous electrolyte battery, wherein, in the step (1a), a plurality of active material layers of a first polarity are intermittently formed on a flat portion of one surface of a band-shaped metal sheet except for a peripheral portion thereof, thereby producing an outer electrode plate assembly comprising a plurality of outer electrode plate units aligned in a row and, in the step (3a), a pair of the outer electrode plate assemblies are prepared, each outer electrode plate unit of one of the outer electrode plate assemblies and each outer electrode plate unit of the other outer electrode plate assembly are successively disposed so as to face each other, with the active material layers disposed facing inwardly, and the electrode plate of a second polarity is successively sandwiched by a pair of outer electrode plate units facing each other, with a separator layer interposed therebetween.

In the step (3a), an additional electrode plate of a first polarity may be disposed adjacent to the electrode plate of a second polarity, with a separator layer interposed therebetween, and an additional electrode plate of a second polarity may be disposed adjacent to the additional electrode plate of a first polarity, with a separator layer interposed therebetween.

In the step (3a), a paste comprising a starting material of the separator layer may be applied on the active material layer of a first polarity or the electrode plate of a second polarity to form the separator layer.

It is preferable that the starting material of the separator layer contains a gel-forming agent.

As the gel-forming agent, a polymer capable of absorbing a liquid non-aqueous electrolyte and forming a gel electrolyte, is employed.

The present invention also relates to a method of producing a non-aqueous electrolyte battery comprising the steps of:

(1b) preparing a metal sheet provided with a crease line or an imaginary crease line at which the sheet is to be folded so as to have two flat portions facing each other;

(2b) forming a pair of active material layers of a first polarity on the flat portions, symmetrical with respect to the crease line or imaginary crease line, of one surface of the metal sheet except for peripheral portions thereof, thereby producing outer electrode plate;

(3b) producing an electrode plate of a second polarity;

(4b) folding the outer electrode plate at the crease line or imaginary crease line to sandwich the electrode plate of a second polarity by the pair of active material layers with a separator layer interposed therebetween; and (5b) joining peripheral portions of the outer electrode plate facing each other.

Herein, the imaginary crease line refers to a line dividing the metal sheet into two sections, which line is assumed as a measure or standard for folding the metal sheet so as to have two flat portions facing each other.

The present invention also relates to the method of producing a non-aqueous electrolyte battery, wherein, in the step (1b), a band-shaped metal sheet is prepared, which is provided with a crease line or an imaginary crease line parallel with a longitudinal direction, in the step (2b), plural pairs of active material layers of a first polarity are intermittently formed on flat portions, symmetrical to the crease line or imaginary crease line, of one surface of the band-shaped metal sheet except for peripheral portions thereof, thereby producing an outer electrode plate assembly comprising a plurality of outer electrode plate units aligned in a row and, in the step (4b), the electrode plate of a second polarity is successively sandwiched by a pair of active material layers of each outer electrode plate unit, with the separator layer interposed therebetween.

In the step (4b), an additional electrode plate of a first polarity may be disposed adjacent to the electrode plate of a second polarity with a separator layer interposed therebetween, and an additional electrode plate of a second polarity may be disposed adjacent to the additional electrode plate of a first polarity with a separator layer interposed therebetween.

In the step (4b), a paste comprising a starting material of the separator layer may be applied on the active material layer of a first polarity or the electrode plate of a second polarity, thereby forming the separator layer.

It is preferable that the starting material of the separator layer contains a gel-forming agent.

As the gel-forming agent, a polymer capable of absorbing a liquid non-aqueous electrolyte and forming a gel electrolyte, is employed.

BEST MODE FOR CARRYING OUT THE INVENTION

Embodiment 1

Figure 1:
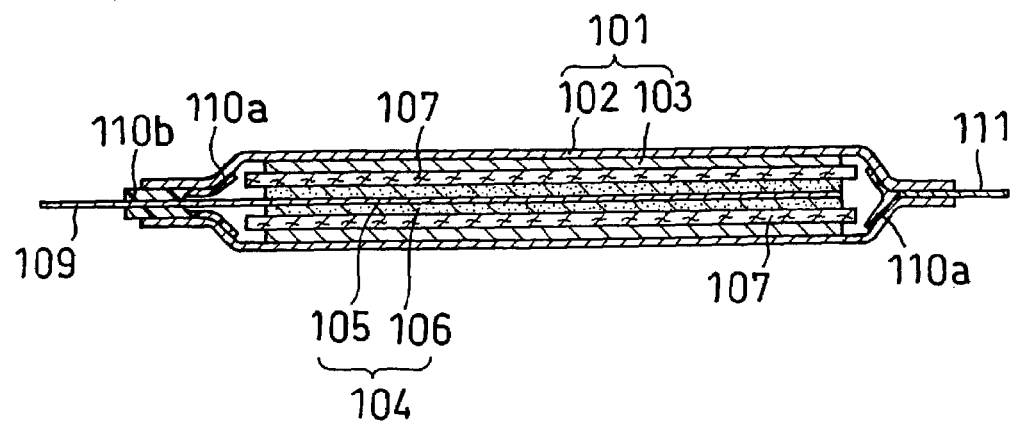
FIG. 1 is a vertical sectional view of an example of a non-aqueous electrolyte battery comprising one stack in accordance with the present invention.

FIG. 1 shows a vertical sectional view of a non-aqueous electrolyte battery of Embodiment 1 in accordance with the present invention.

This battery comprises: an outer jacket comprising metal sheets 102 and having two primary flat portions facing each other; two active material layers of a first polarity 103 respectively carried on inner surfaces of the flat portions; an electrode plate of a second polarity 104 disposed in a position facing with each of the active material layers 103; and separator layers 107 each interposed between each of the active material layers 103 and the electrode plate of a second polarity 104, and the outer jacket also serves as the current collector of the active material layers 103. The metal sheet 102 and the active material layers 103 respectively carried on the flat portions of the metal sheet, constitute an outer electrode plate 101.

The separator layer 107 contains a polymer electrolyte. It is preferable that the active material layer 103 or an active material layer 106 of the electrode plate of a second polarity 104 contains a polymer electrolyte from the viewpoint of improving the charge/discharge characteristic of the battery. In order to provide a polymer electrolyte in the active material layer, the polymer electrolyte is mixed with the starting material of the active material layer to prepare an electrode mixture, and the electrode mixture is used to form an active material layer. Or alternatively, an active material layer containing a gel-forming agent which comprises a cross-linking polymer is formed, and, after the cross-linking polymer is crosslinked, a liquid non-aqueous electrolyte is absorbed in the active material layer.

A lead 109 is connected to the extension of a current collector 105 which constitutes the electrode plate of a second polarity 104. An insulating resin 110b is coated around the lead 109 at the portion sandwiched between the peripheral portions of the metal sheets 102. While the lead is not necessarily be provided to the outer electrode plate 101, a lead 111 is welded so as to be sandwiched between the peripheral portions of the metal sheets 102, in FIG. 1.

A pair of the outer electrode plates 101 is joined at the peripheral portions facing each other of their respective metal sheets 102. In this manner, since a pair of the metal sheets 102 of this battery have the same polarity, their peripheral portions can be joined together by welding. They can be firmly joined by laser welding or ultrasonic welding.

Even when the peripheral portions of the metal sheets 102 are joined with an adhesive 110a, it is possible to apply a sufficient pressure thereto, thereby improving the reliability of the joined portion. The adhesive 110a used herein need not have insulating property.

In this battery, the metal sheet 102 has the active material layer 103 on one surface thereof, and the other surface serves as the outer surface of the outer jacket. With such structure, it is not necessary to separately prepare an outer jacket for covering the power generating elements. Thus, a thin, compact battery with high energy density can be produced.

The outer surface of the outer electrode plate 101 may be coated with a resin layer for the purpose of reinforcing. For example, it is effective to form a resin layer on the outer surface of the outer electrode plate 101 except on its portion to be used as an external terminal. Alternatively, a resin film may be attached on the outer surface of the outer electrode plate 101. Preferably, a portion of the battery susceptible to damage, such as a corner portion, may be reinforced with resin.

Next, detailed descriptions are made on the method of producing the non-aqueous electrolyte battery of Embodiment 1 in accordance with the present invention.

(i) Step (1a)

Figure 2:
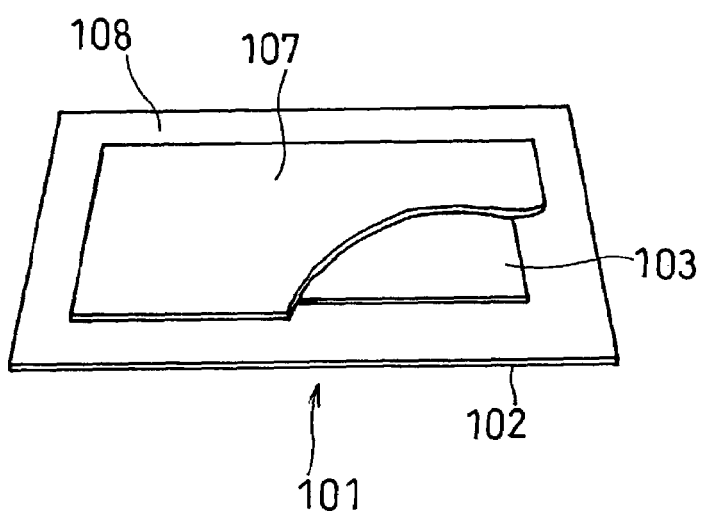
FIG. 2 is an oblique view of an example of an outer electrode plate comprising a metal sheet serving as a current collector and an active material layer formed on one surface of the same.

The step (1a) is the step of forming an active material layer of a first polarity on a flat portion of one surface of a metal sheet except for a peripheral portion thereof, thereby producing an outer electrode plate. FIG. 2 is an oblique view of the outer electrode plate 101 produced in the step (1a) which comprises the metal sheet 102 and the active material layer 103 formed on one surface thereof.

Figure 3:
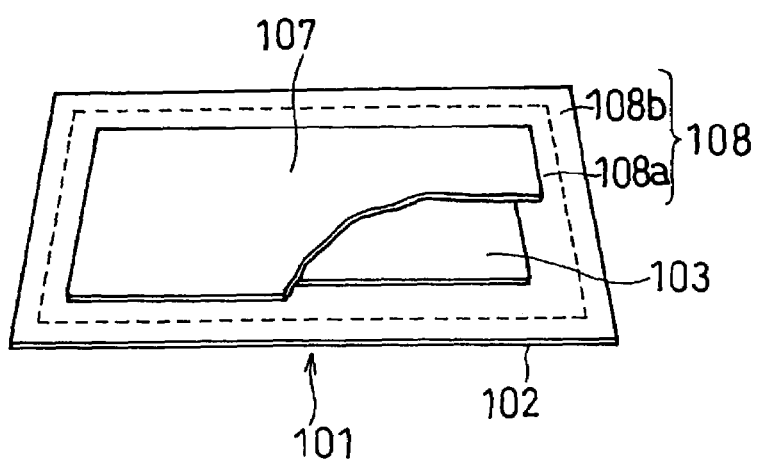
FIG. 3 is an oblique view of an example of an outer electrode plate with the region to be provided with an adhesive indicated by dashed lines.

Metal is exposed at a peripheral portion 108 of the metal sheet 102. When peripheral portions 108 facing each other are joined with an adhesive, it is preferable to: divide each of the peripheral portions 108 into an exposed metal portion inside dashed lines 108a and an exposed metal portion outside dashed lines 108b, as shown in FIG. 3; provide the adhesive to one of the exposed metal portion 108a and the exposed metal portion 108b; and join another of the exposed metal portions by ultrasonic welding or laser welding. The combined use of an adhesive and welding can greatly improve the bonding strength.

There is no specific limitation on the method of providing an electrode mixture of a first polarity on the flat portion of one surface of the metal sheet 102 except for the peripheral portion 108 to form the active material layer 103. For example, it can be performed by using any conventional coating apparatus. It is preferable that the active material layer 103 has a thickness of 30 to 300 µm. The peripheral portion 108 has a width of, for example, 1 to 10 mm.

As the metal sheet 102, a metal sheet having no pore is used, since it serves both as the current collector of the outer electrode plate 101 and the outer surface of the outer jacket. Since the active material layer 103 formed on the inner side of the outer electrode plate 101 has the effect of improving the strength of the outer jacket, a thin metal sheet having a thickness of about 10 µm can be used. A thin metal sheet is suitable for closely attaching the active material layer to form a flexible outer electrode plate. A preferred thickness of the metal sheet 102 is 10 to 100 µm. When the metal sheet 102 is too thick, the battery thickness may be increased or the energy density of the battery may be decreased.

In the case of using a thin metal sheet, consideration needs to be given to corrosion of the metal sheet. From the viewpoint of corrosion resistance, the metal sheet 102 preferably comprises aluminum or aluminum alloy when the outer electrode plate 101 is the positive electrode. On the other hand, the metal sheet 102 preferably comprises copper, iron, copper alloy or iron alloy when the outer electrode plate 101 is the negative electrode. When the metal sheet 102 comprises iron or iron alloy, it is preferable to plate the surface thereof with nickel.

The positive electrode mixture is prepared, for example, by mixing a positive electrode active material, conductive agent, binder, dispersion medium and the like. The negative electrode mixture is prepared, for example, by mixing a negative electrode material, binder, dispersion medium and the like. As described above, the electrode mixture may be further added with a polymer electrolyte or a gel-forming agent.

As the positive electrode active material, any of positive electrode active materials commonly used in the non-aqueous electrolyte battery may be employed without any specific limitation. As the positive electrode active material, a lithium-containing transition metal oxide, such as $LiCoO_2$, $LiNiO_2$ or $LiMn_2O_4$, is preferably used. It is preferable that the positive electrode active material has a mean particle diameter of 1 to 100 µm.

As the negative electrode material, any of negative electrode materials commonly used in the non-aqueous electrolyte battery may be employed without any specific limitation. As the negative electrode material, natural graphite or artificial graphite is preferably used. It is preferable that the negative electrode material has a mean particle diameter of 1 to 100 µm.

As the conductive agent, carbon powder such as graphite powder or carbon black, or carbon fiber is preferably used.

As the binder, a fluorocarbon resin, which has resistance to a non-aqueous electrolyte, is preferably used. For example, polytetrafluoroethylene, a copolymer of tetrafluoroethylene and hexafluoropropylene, polyvinylidene fluoride, a copolymer of vinylidene fluoride and hexafluoropropylene or the like is preferably used. These polymers can also be used as the gel-forming agent.

As the dispersion medium, N-methyl-2-pyrrolidone is preferably used.

(ii) Step (2a)

The step (2a) is the step of producing an electrode plate of a second polarity 104, which is the counter electrode of the outer electrode plate 101. The electrode plate of a second polarity 104 may be produced by providing an electrode mixture of a second polarity on both surfaces of a sheet-like current collector 105 to form active material layers 106. There is no specific limitation on the method of providing the electrode mixture of a second polarity on both surfaces of the sheet-like current collector 105 to form the active material layers 106. For example, it can be performed by using any conventional common coating apparatus. For example, a common coating apparatus is used to continuously apply the electrode mixture of a second polarity on both surfaces of a band-shaped metal sheet, followed by cutting the same. It is preferable that the active material layer 106 has a thickness of, for example, 30 to 300 µm.

As the sheet-like current collector 105, a metal sheet, metal mesh, punched metal, metal lath sheet or the like may be employed. The surface of the sheet-like current collector 105 may be roughened by etching, or may be provided with a conductive agent. When the electrode plate of a second polarity 104 is the negative electrode, the sheet-like current collector 105 preferably comprises copper, iron, copper alloy or iron alloy. When the sheet-like current collector 105 comprises iron or iron alloy, it is preferable to plate the surface thereof with nickel. When the electrode plate of a second polarity is the positive electrode, the sheet-like current collector 105 preferably comprises aluminum or aluminum alloy. It is preferable that the sheet-like current collector 105 has a thickness of 10 to 100 µm.

A lead 109 is connected to the electrode plate of a second polarity 104. The lead 109 may be formed by utilizing a portion of the current collector 105. The lead 109 is coated with the insulating resin 110b at a portion to be sandwiched between the peripheral portions 108 of the metal sheets 102 which serve as the current collector of the outer electrode plate 101.

(iii) Step (3a)

The step (3a) is the step of sandwiching the electrode plate of a second polarity 104 by a pair of the outer electrode plates 101 each having the active material layer 103 disposed on the inner side thereof, with the separator layers 107 interposed therebetween. The separator layer 107 is formed by previously molding the separator layer 107 into the shape of a film and disposing it between the electrode plates, or by applying a paste comprising the starting material of the separator layer 107 onto an electrode plate of one polarity and placing thereon an electrode plate of another polarity.

The separator layer 107 may be composed only of a polymer electrolyte, or may be a hybrid comprising a polymer electrolyte and either a microporous membrane or non-woven fabric. As the polymer electrolyte, conventionally known ones may be employed without any specific limitation. Particularly, a gel electrolyte comprising a liquid non-aqueous electrolyte and a polymer retaining the same is preferably used. The separator layer may contain a powder of alumina, silica or the like. These powders perform the function of ensuring the separation between the electrode plates in a stacked and compressed electrode plate group.

Figure 4:
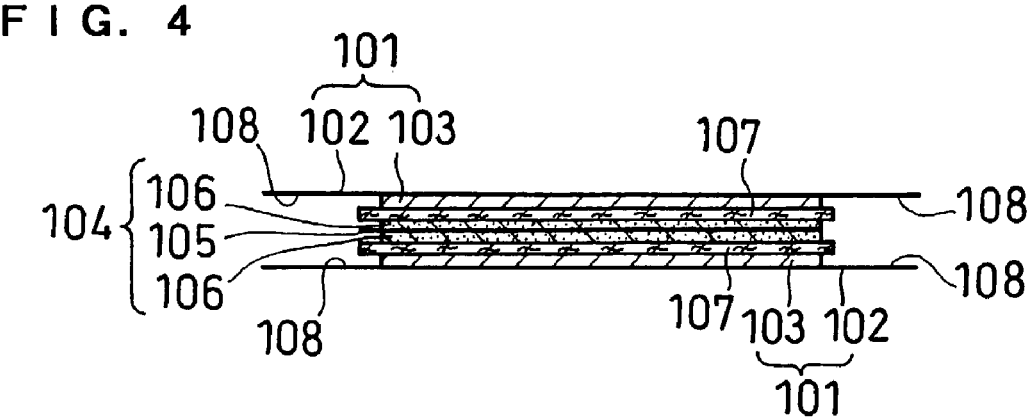
FIG. 4 is a vertical sectional view of an example of an electrode plate group comprising one stack.

For example, as shown in FIG. 2 or 3, it is preferable to completely cover the active material layer 103 of the outer electrode plate 101 by the separator layer 107. By sandwiching a single sheet of the electrode plate of a second polarity 104 by a pair of the outer electrode plates 101 using two sheets of the separator layers 107, and compressing the whole while heating, an electrode plate group as shown in FIG. 4 is produced, in which all the electrode plates and separator layers are integrated. The heating temperature used herein is preferably 80 to 160° C. When a thermoplastic resin is provided, as an adhesive, at the peripheral portion 108 of the metal sheet 102 constituting the outer electrode plate 101, prior to compressing the electrode plate group, it is possible to join the peripheral portions 108, simultaneously with the compressing.

As the liquid non-aqueous electrolyte, a non-aqueous solvent containing a solute dissolved therein is preferably used. As the solute, lithium salts, such as $LiPF_6$ and $LiBF_4$ are preferable. As the non-aqueous solvent, ethylene carbonate, dimethyl carbonate, ethyl methyl carbonate, propylene carbonate, diethyl carbonate and the like are employed. These may be used alone or in combination.

As the polymer or gel-forming agent retaining the liquid non-aqueous electrolyte, a polymer which can be cross-linked by UV irradiation or heating, is preferably used. When the polymer or gel-forming agent is cross-linked after forming the electrode plate group, a polymer which can be cross-linked by heating is particularly preferable. When the separator layer 107 is formed on the active material, as shown in FIG. 3, a polymer which can be cross-linked by UV irradiation may also be employed.

Examples of the preferable gel-forming agent include fluorocarbon resins having resistance to a non-aqueous electrolyte. Among fluorocarbon resins, polyvinylidene fluoride, a copolymer of vinylidene fluoride and hexafluoropropylene and the like are particularly preferable. A mixture of each of these polymers with a solvent such as N-methyl-2-pyrrolidone is suitably used as the paste comprising the starting material of the separator layer, because the viscosity thereof can be freely adjusted.

The paste comprising the starting material of the separator layer may be added with an oil component such as dibutyl phthalate. In this case, the oil component is extracted or removed with a solvent such as ether, hexane or acetone, after forming the separator layer. As a result, a large number of micropores are formed in the separator layer. Such a separator layer quickly absorbs the liquid non-aqueous electrolyte even within a thin electrode plate group, thereby effectively promoting the gelation.

(iv) Step (4a)

The step (4a) is the step of joining the peripheral portions 108 of the metal sheets 102 constituting the outer electrode plates 101 facing each other. The joining is performed, for example, by laser welding, ultrasonic welding or by means of an adhesive.

Ultrasonic welding or laser welding allows a direct joining of the peripheral portions of the metal sheets, thereby making it possible to reduce the space of the peripheral portions required for the joining, compared with the case where an adhesive is used.

Additionally, as described above, it is also possible to: divide each of the peripheral portions 108 into an exposed metal portion 108a inside dashed lines and the exposed metal portion 108b outside dashed lines, as shown in FIG. 3; provide the adhesive to one of the exposed metal portion 108a and the exposed metal portion 108b; and join another of the exposed metal portions by ultrasonic welding or laser welding.

As the adhesive, a thermosetting resin such as an epoxy resin or a thermoplastic resin such as polyolefin may be employed. The latter is superior in workability. Among thermoplastic resins, polyethylene and polypropylene are suitable because they have a high melting point.

In the case of injecting the liquid non-aqueous electrolyte into the battery after the joining, an unjoined region is reserved between the peripheral portions 108 facing each other, instead of completely joining them. Then, the non-aqueous electrolyte is injected from the unjoined region after the step (4a).

Embodiment 2

In general, a polymer electrolyte contains a flammable non-aqueous solvent. In case the battery is short-circuited or its charging circuit breaks down, the battery may be subjected to overcharging with a large current for a long time. In such a case, owing to an abnormally increased battery temperature, the non-aqueous electrolyte is decomposed to generate a flammable gas, resulting in the swelling of the battery or the degradation in the battery function. In order to obviate this, an overcurrent breaking device is connected to a circuit of equipment in which the battery is installed. As the overcurrent breaking device, a thermal fuse or a device (hereinafter, referred to as "PTC devices") having a positive temperature resistance coefficient is preferably used, for example. Because its resistance increases with an increase in temperature, the PTC device serves to break or reduce a current at elevated temperatures.

Figure 5:
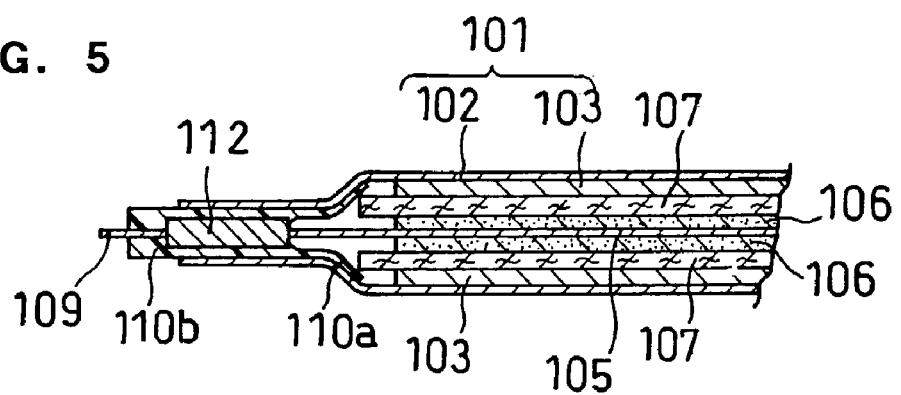
FIG. 5 is a vertical sectional view showing a main part of an example of a non-aqueous electrolyte battery comprising one stack in accordance with the present invention, which is provided with a PTC device.

FIG. 5 is a vertical sectional view showing a main part of a non-aqueous electrolyte battery of Embodiment 2 in accordance with the present invention, which is provided with a PTC device 112. Components having similar structures or compositions to those of Embodiment 1 are numbered with the same numbers as those of Embodiment 1.

The PTC device 112 is disposed on a lead 109 sandwiched between the peripheral portions of outer electrode plates 101, in the state of being sealed with an insulating resin 110b. The insulating resin 110b preferably has resistance to a non-aqueous electrolyte.

In the above-described configuration, since the PTC device 112 and the battery are integrated with each other, a temperature change in the battery can be sensitively transmitted to the PTC device 112, thereby effectively preventing an abnormal temperature increase.

Embodiment 3

Figure 6:
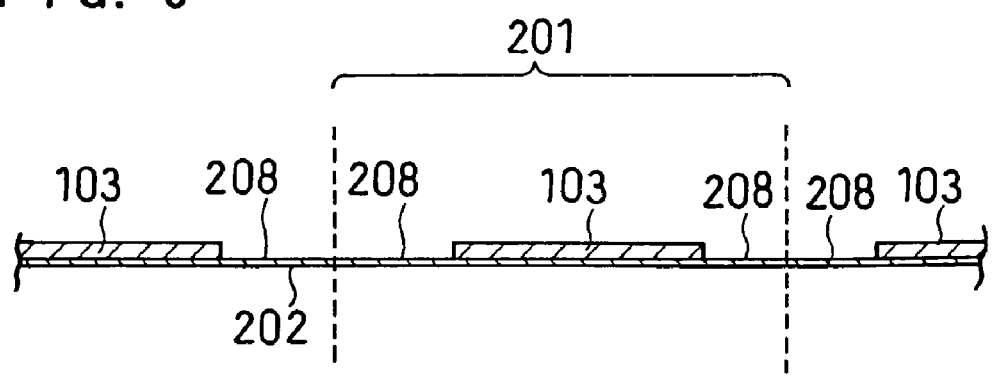
FIG. 6 is a sectional view of an example of outer electrode plate assembly, prior to cutting.

In the step (1a), as shown in FIG. 6, it is effective to intermittently form a plurality of active material layers of a first polarity 103 on the flat portion of one surface of a band-shaped metal sheet 202 except for the peripheral portion thereof, thereby producing an outer electrode plate assembly comprising a plurality of outer electrode plate units 201 aligned in a row. Intermittently forming a plurality of the active material layers of a first polarity 103 results in an exposed metal portion (peripheral portion) 208 reserved around each of the active material layers 103.

Figure 7:
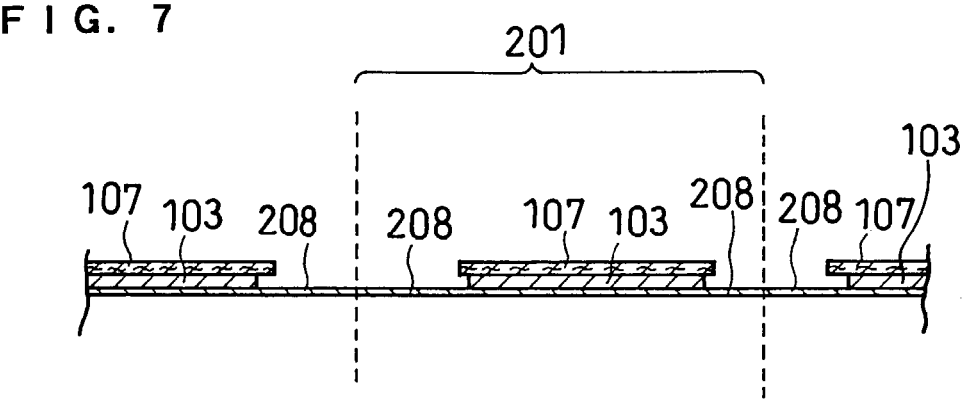
FIG. 7 is a sectional view of an example of an outer electrode plate assembly having a separator layer, prior to cutting.

While the outer electrode plate assembly may be used after being separated into individual outer electrode plate units 201, using the outer electrode plate assembly as it is allows a series of the steps to be continuously performed, thereby making it possible to produce the battery efficiently. More specifically, in the step (3a), a pair of outer electrode plate assemblies is prepared, and a separator layer 107 is formed on each of the active material layers 103 of each of the outer electrode plate assemblies as shown in FIG. 7.

Figure 8:
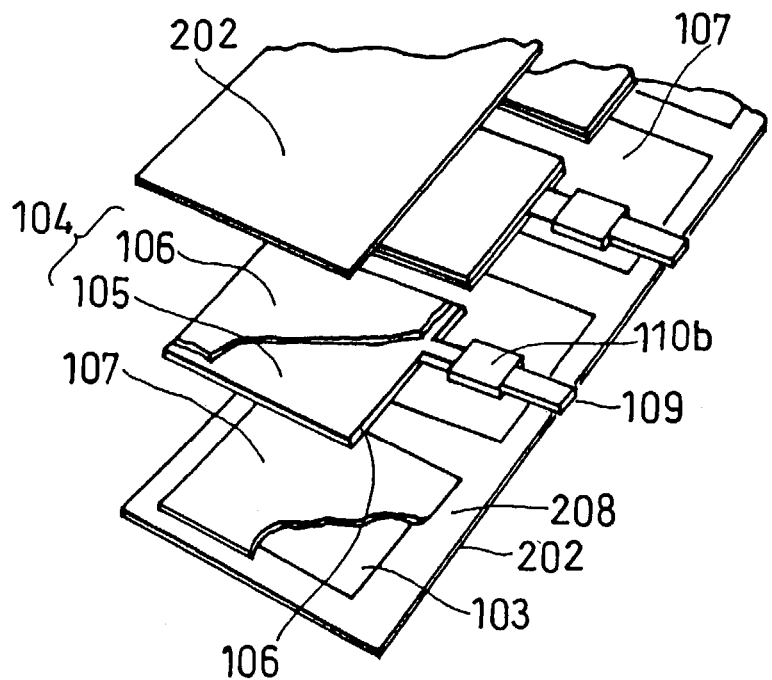
FIG. 8 is an oblique view showing an example of the internal structure of an electrode plate group assembly, prior to cutting.

Subsequently, as shown in FIG. 8, each of the electrode plate units of one of the outer electrode plate assemblies and each of the outer electrode plate units of the other outer electrode plate assembly are successively disposed so as to face each other, with the active material layers 103 thereof disposed facing inwardly, and the electrode plate of a second polarity 104 is successively sandwiched by a pair of the outer electrode plate units facing each other, with the separator layer 107 interposed therebetween.

Figure 9:
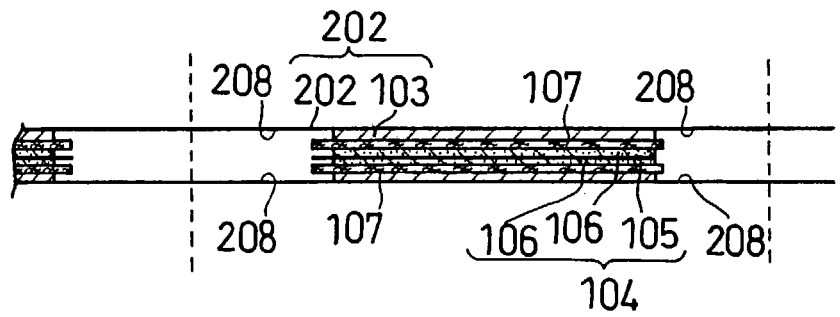
FIG. 9 is a vertical sectional view of an example of an electrode plate group assembly, prior to cutting.

The electrode plate of a second polarity 104 is formed by providing an active material layer of a second polarity 106 on both surfaces of a sheet-like current collector 105, and the lead 109 coated with the insulating resin 110b is connected to the sheet-like current collector 105. As a result, an electrode plate group assembly as shown in FIG. 9 is produced.

Figure 10:
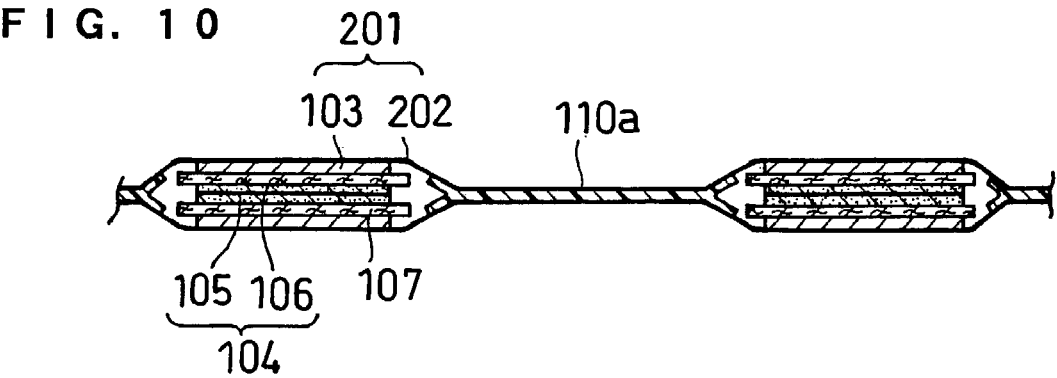
FIG. 10 is a vertical sectional view of an example of a battery assembly, prior to cutting.

Alternatively, when an adhesive 110a is previously provided at the peripheral portion 208 of the outer electrode plate unit 201 in the step (1a), a battery assembly as shown in FIG. 10 can be produced in the step (3a). The battery assembly may be either used as it is, or used after being separated.

Figure 11:
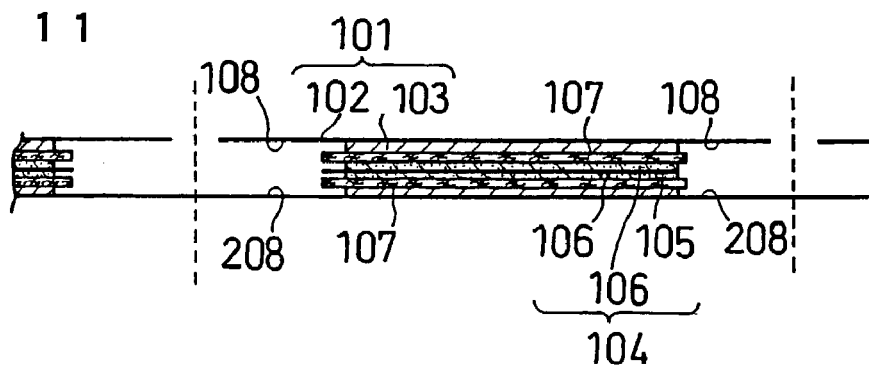
FIG. 11 is a vertical sectional view of an example of another electrode plate group assembly prior to cutting.

It is also possible to use one of the outer electrode plates in the form of an assembly, and use the other after separating it. In this case, the step (3a) gives an electrode plate group assembly as shown in FIG. 11.

It should be noted that each component of the non-aqueous electrolyte battery of Embodiment 3 has the same structure or composition as those of Embodiment 1, except that the metal sheet 202 constituting the outer electrode plate is originally band-shaped. In FIGS. 6 to 12, components having similar structures or compositions to those of Embodiment 1 are numbered with the same numbers as those of Embodiment 1.

Embodiment 4

Figure 12:
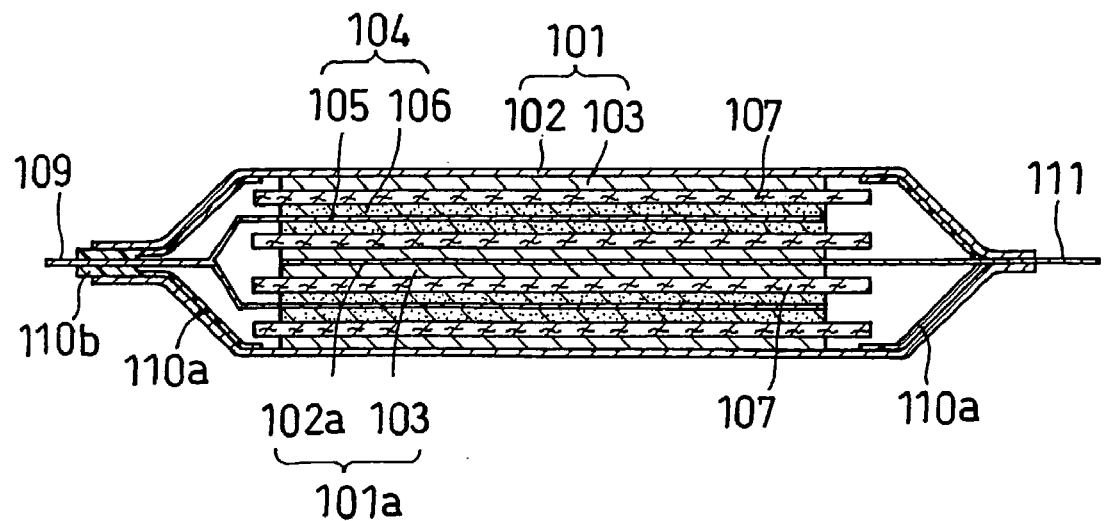
FIG. 12 is a vertical sectional view of an example of a non-aqueous electrolyte battery comprising two stacks in accordance with the present invention.

FIG. 12 shows a vertical sectional view of a non-aqueous electrolyte battery of Embodiment 4 in accordance with the present invention. This battery is a non-aqueous electrolyte battery in a double-stacked form, which further comprises: an additional electrode plate of a first polarity 110a disposed adjacent to the electrode plate of a second polarity 104, with a separator layer 107 interposed therebetween; and an additional electrode plate of a second polarity 104 disposed adjacent to the additional electrode plate of a first polarity 110a, with a separator layer 107 interposed therebetween.

Although the battery in a double-stacked form is shown herein, any number of the electrode plates of a second polarity 104 may be sandwiched by the outer electrode plates of a first polarity 101.

When a battery has two or more electrode plates of a second polarity 104 as in this case, an additional electrode plate of a first polarity is interposed between the electrode plates of a second polarity. With this structure, it is possible to increase the battery capacity by appropriately selecting the number of the electrode plates and the thickness of the active material layer, without degrading the high-rate discharge characteristic. Therefore, increasing the battery capacity does not excessively increase the battery area, or increase the thickness of the active material layer so that the active material utilization or high-rate discharge characteristic will not be reduced.

In the case of FIG. 12, two current collectors 105 of the electrode plates of a second polarity 104 are connected to a single lead 109 which penetrates through an insulating resin 110b to be drawn to the outside from within the battery. On the other hand, a current collector 102a of the additional electrode plate of a first polarity 101a having the same polarity as the outer electrode plate 101, is connected to the outer electrode plates 101, in the state of being sandwiched between the peripheral portions of the metal sheets 102, and is drawn to the outside from within the battery to serve as a lead 111.

As the current collector 102a of the additional electrode plate of a first polarity 101a, a metal sheet, metal mesh, punched metal, metal lath sheet and the like may be employed. The surface of the current collector 102a may be roughened by etching, or may be provided with a conductive agent. When the additional electrode plate of a first polarity 101a is the negative electrode, the current collector 102a preferably comprises copper, iron, copper alloy or iron alloy. When the current collector 10aa comprises iron or iron alloy, it is preferable to plate the surface thereof with nickel. When the additional electrode plate of a first polarity 101a is the positive electrode, the current collector 102a preferably comprises aluminum or aluminum alloy. It is preferable that the current collector 102a has a thickness of 10 to 100 µm.

Figure 13:
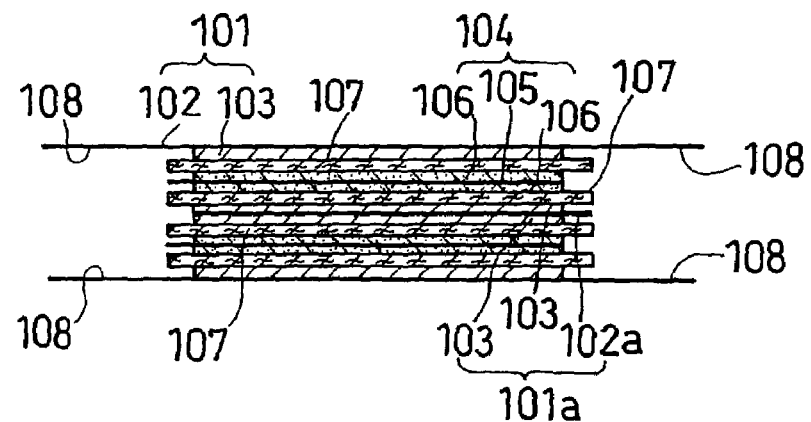
FIG. 13 is a vertical sectional view of an example of an electrode plate group comprising two stacks.

The battery of Embodiment 4 can be produced in the same manner as in the case of the batteries of Embodiments 1 to 3, except that, in the step (3a), in place of a single sheet of the electrode plate of a second polarity, a pair of electrode plates of a second polarity sandwiching an additional electrode plate of a first polarity with a separator layer interposed therebetween, is used to produce an electrode plate group as shown in FIG. 13.

It should be noted that the non-aqueous electrolyte battery of Embodiment 4 has the same structure or composition as that of Embodiment 1, except that it has two sheets of electrode plates of a second polarity and an additional electrode plate of a first polarity. In FIGS. 12 to 13, components having similar structures or compositions to those of Embodiment 1 are numbered with the same numbers as those of Embodiment 1.

Embodiment 5

Figure 14:
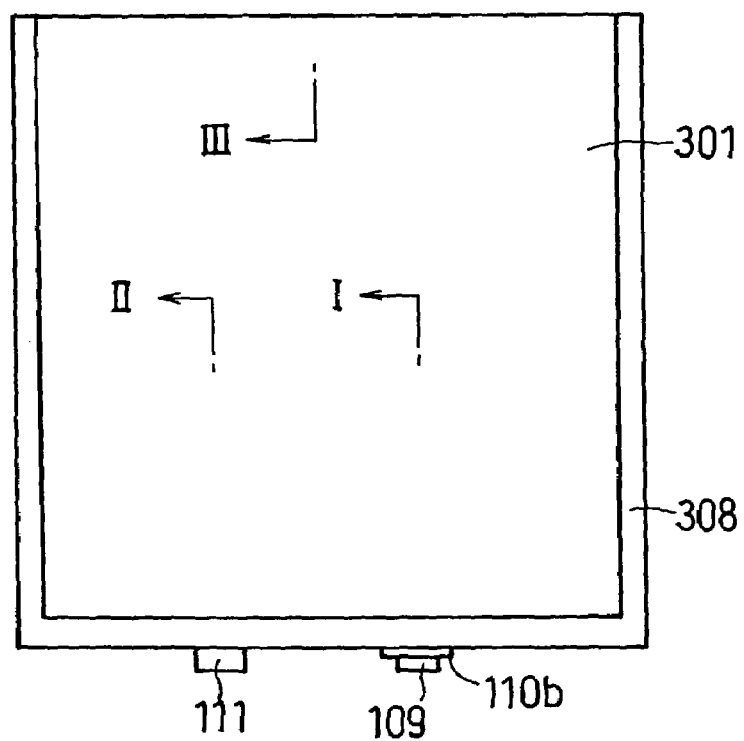
FIG. 14 is a plane view of an example of a non-aqueous electrolyte battery in accordance with the present invention.
Figure 15:
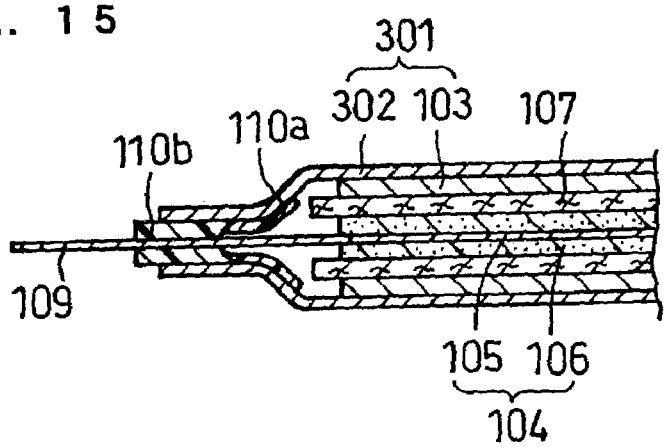
FIG. 15 is an example of a sectional view taken on line I—I in FIG. 14.

FIG. 14 shows a plane view of a non-aqueous electrolyte battery of Embodiment 5 in accordance with the present invention. Further, FIG. 15, FIG. 16 and FIG. 17 show examples of sectional views taken on lines I—I, II—II and III—III in FIG. 14, respectively.

This battery has the same structure as the battery of Embodiment 1, except that the outer jacket serving also as the current collector of an outer electrode plate 301, comprises a single metal sheet folded so as to have two flat portions facing each other. In FIGS. 14 to 17, components having similar structures or compositions to those of Embodiment 1 are numbered with the same numbers as those of Embodiment 1.

Accommodated inside an outer electrode plate 301 comprising a metal sheet 302 and active material layers of a first polarity 103 formed on one surface thereof, is an electrode plate of a second polarity 104 comprising a current collector 105 and active material layers of a second polarity 106 formed on both surfaces thereof, with a separator layer 107 interposed therebetween. The peripheral portions of the metal sheet 302 serving as the current collector of the outer electrode plate 301 are joined with an adhesive 110*a*. A lead 109 is connected to the current collector 105 of the electrode plate of a second polarity 104, and the lead 109 is coated with an insulating resin 110*b* at a part thereof sandwiched between the peripheral portions 308 of the metal sheet 302.

Figure 16:
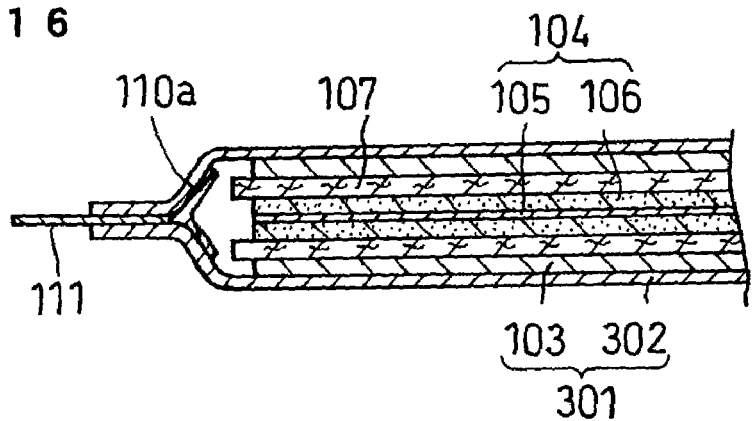
FIG. 16 is an example of a sectional view taken on line II—II in FIG. 14.
Figure 17:
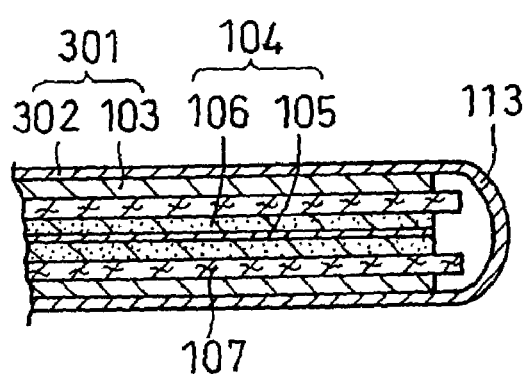
FIG. 17 is an example of a sectional view taken on line III—III in FIG. 14.

As shown in FIG. 16, a lead 111 is directly connected to the metal sheet 302 serving as the current collector of the outer electrode plate 301. While the lead 111 may be connected to any part of the metal sheet 302, it is sandwiched between the peripheral portions 308 of the metal sheet 302 in FIG. 16.

In the case of the battery of Embodiment 5, since the metal sheet 302 serving also as the outer jacket is folded so as to have two flat portions facing each other, a crease line 113 is formed as shown in FIG. 17.

With this structure, it is not necessary to provide any space for the joining at the part of the metal sheet corresponding to the crease line 113, so that the battery area is reduced by such space. It is also possible to simplify the joining step of the peripheral portions of the metal sheet 302.

Next, detailed descriptions are made on the method of producing the non-aqueous electrolyte battery of Embodiment 5 in accordance with the present invention.

(i) Step (1b)

The step (1b) is the step of preparing a metal sheet provided with a crease line or an imaginary crease line to be folded so as to have two flat portions facing each other. As this metal sheet, a metal sheet similar to the one used for the outer electrode plate in Embodiment 1 may be used. More specifically, a metal sheet having a shape in which two pieces of the metal sheets used for the outer electrode plate of Embodiment 1 are connected, is prepared and a crease line or imaginary crease line is positioned at the center thereof. It is preferable to previously provide the metal sheet with a crease line.

(ii) Step (2b)

The step (2b) is the step of forming a pair of active material layers of a first polarity on the flat portions, symmetrical with respect to the crease line or imaginary crease line, of one surface of the metal sheet except for peripheral portions thereof, thereby producing an outer electrode plate.

The method of applying the electrode mixture to the metal sheet is not specifically limited, and can be performed by using any conventional common coating apparatus. It is preferable that the active material layer has a thickness of, for example, 30 to 300 μm. It is preferable that the peripheral portion of the metal sheet to be reserved for the joining has a width of 1 to 10 mm.

(iii) Step (3b)

The step (3b) is the step of producing an electrode plate of a second polarity. The electrode plate of a second polarity can be produced in the same manner as in the case of the electrode plate of a second polarity of Embodiment 1.

(iv) Step (4b)

The step (4b) is the step of folding the outer electrode plate at the crease line or imaginary crease line to sandwich the electrode plate of a second polarity by the pair of active material layers of a first polarity with separator layers interposed therebetween.

Figure 18:
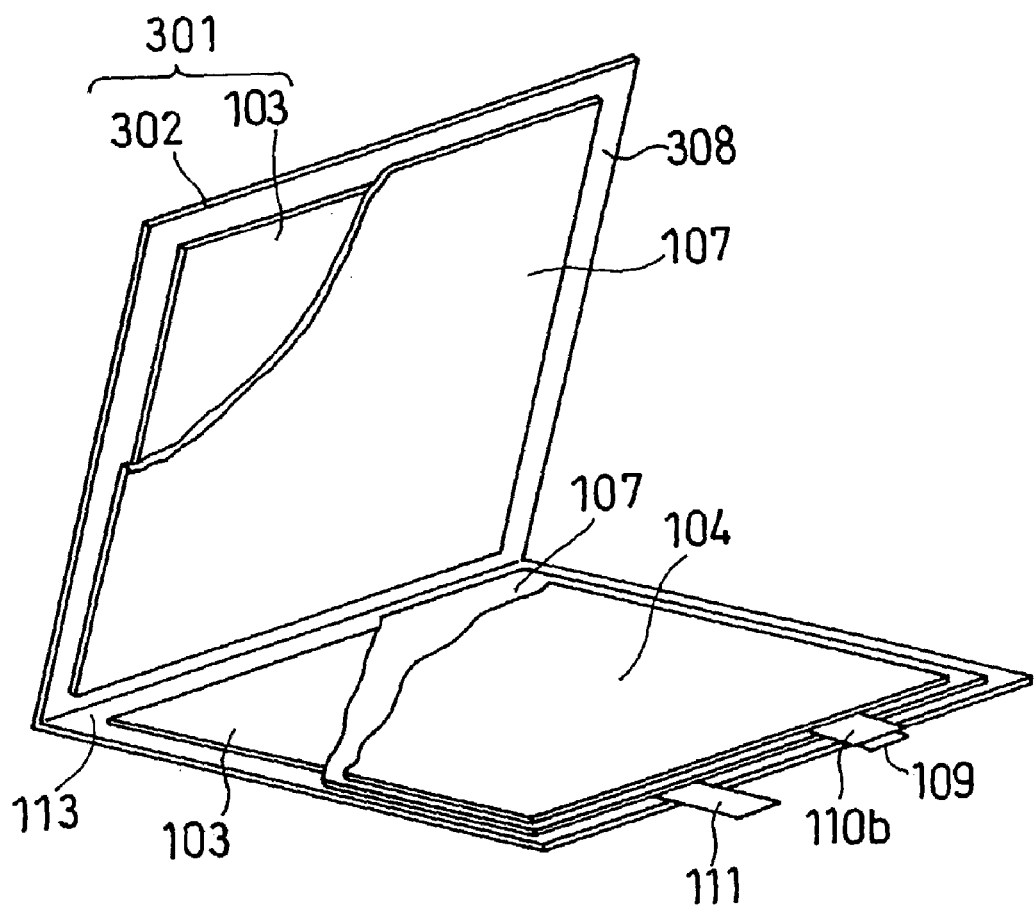
FIG. 18 is an oblique view of an uncompleted non-aqueous electrolyte battery with an outer electrode plate thereof bent halfway.

FIG. 18 shows an uncompleted non-aqueous electrolyte battery with an outer electrode plate thereof bent halfway in the step (4b). In FIG. 18, the outer electrode plate 301 has two active material layers of a first polarity 103 respectively at the positions, symmetrical with respect to the crease line 113, of the inner surface thereof. The peripheral portions 308, which are exposed metal portions, are reserved as a region for the joining, around the active material layers 103. Although not shown herein, when the peripheral portions 308 are joined with an adhesive, it is preferable to provide an adhesive for the joining to the four sides of the peripheral portions 308, except for the sides corresponding to the crease line 113. When the peripheral portions 308 are joined by welding, the adhesive may not be necessarily provided.

A separator layer 107 is disposed on each of the active material layers of a first polarity 103, and an electrode plate of a second polarity 104 provided with a lead 109 is placed on one of the separator layers 107. The lead 109 is coated with an insulating resin 110*b* at a portion thereof to be sandwiched between the peripheral portions 308 of a metal sheet 302. Further, one end of a lead 111 of the outer electrode plate is placed on the peripheral portion 308 of the metal sheet 302.

By completely folding the outer electrode plate 301 at the crease line 113 in the above-described arrangement, an electrode plate group is formed. In order to improve the accuracy of the operations and the workability, it is preferable to previously provide the metal sheet 302 with the crease line 113, instead of folding the metal sheet 302 at the imaginary crease line.

After being stacked, the electrode plate group is compressed to cause the components to sufficiently adhere together so that they are integrated. When the separator layer or the active material layer contains, as a gel-forming agent, a thermally-crosslinking polymer which is the starting material of the polymer electrolyte, it is preferable to compress the electrode plate group at a temperature at which the gel-forming agent is crosslinked, thereby simultaneously promoting the formation of the polymer electrolyte and the integration of the electrode plate group. As such a temperature, a temperature of 80 to 130° C. is suitable.

(v) Step (5b)

The step (5b) is the step of joining the peripheral portions of the outer electrode plate facing each other. This step can be performed in the same manner as in the step (4a) of Embodiment 1.

Embodiment 6

In order to efficiently produce the battery, it is effective that, in the step (1b), a band-shaped metal sheet 402 is prepared, which is provided with a crease line (or an imaginary crease line) 113 parallel with a longitudinal direction, and in the step (2b), plural pairs of active material layers of a first polarity 103 are intermittently formed on the flat portions, symmetrical to the crease line 113, of one surface of the band-shaped metal sheet 402 except for the peripheral portions thereof, thereby producing an outer electrode plate assembly comprising a plurality of outer electrode plate units 401 aligned in a row. Further, it is effective that, in the step (4b), the electrode plate of a second polarity 104 is successively sandwiched by a pair of active material layers 103 of each outer electrode plate unit, with the separator layers 107 interposed therebetween.

In order to efficiently produce the battery, it is also effective that, in the step (4b), a paste comprising the starting material of the separator layer is applied on the active material layer of a first polarity 103 or the electrode plate of a second polarity 104, thereby forming the separator layer 107. The paste comprising the starting material of the separator layer preferably contains a gel-forming agent and either a solvent or a liquid non-aqueous electrolyte.

Figure 19:
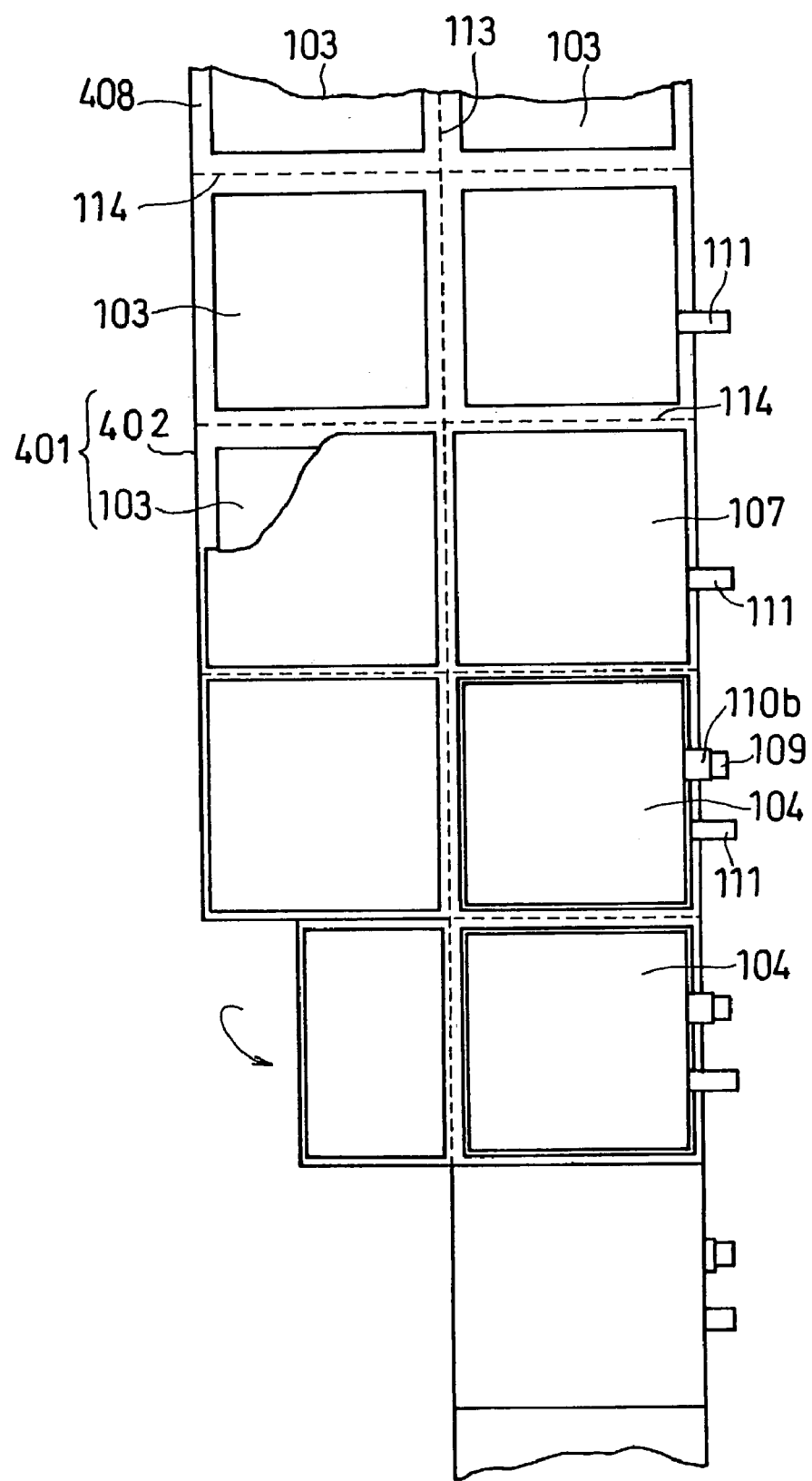
FIG. 19 is a diagram showing the proceeding of a method of producing a non-aqueous electrolyte battery in accordance with the present invention, which employs an outer electrode plate assembly.

In FIG. 19, the production process of the non-aqueous electrolyte battery proceeds in the direction shown by the arrow.

Firstly, the active material layers of a first polarity 103 are successively formed on the positions, symmetrical with respect to a crease line 113, of the band-shaped metal sheet. Herein, where necessary, an adhesive for the joining or a lead 111 for the electrode plate of a first polarity is disposed around the active material layer 103, that is, the a peripheral portion 408 of an electrode plate of a first polarity.

Subsequently, a separator layer 107 is provided so as to cover the surface of each of the active material layers 103. While a separator previously molded in a sheet-shape may be placed on the active material layer, it is more efficient to successively apply, onto the active material layer, a paste comprising the starting material of the separator layer, in the case of a continuous manufacturing process.

Then, an electrode plate of a second polarity 104 is placed on the separator layer 107. A lead 109 previously coated with an insulating resin 110b is connected to the electrode plate of a second polarity 104.

Next, positions to be cut 114 of the band-shaped metal sheet are partly cut off, from its junction with the crease line 113 through one end of the metal sheet. Then, the outer electrode plate is bent at the crease line 113 to place one of the active material layers 103 on the electrode plate of a second polarity 104. While the outer electrode plate can be bent without partly cutting off the positions to be cut 114, it is more preferable to partly cut off the same from the viewpoints of workability and reliability. Subsequently, pressure is applied to the electrode plate group from top and bottom.

While the peripheral portions of the outer electrode plates facing each other can be joined after cutting off the electrode plate group, it is preferable to produce a battery assembly by performing the joining without conducting the cutting off.

Then, it is preferable to cut off each battery after the battery assembly has been completed.

Embodiment 7

The non-aqueous electrolyte battery of Embodiment 7 in accordance with the present invention has the same structure as that of the battery of Embodiment 4, except that the outer jacket serving also as the current collector of the outer electrode plate comprises a single metal sheet folded so as to have two flat portions facing each other. The top plane view of the non-aqueous electrolyte battery of the Embodiment 7 is similar to that of the non-aqueous electrolyte battery of Embodiment 5 in accordance with the present invention and can be shown in FIG. 14.

Figure 20:
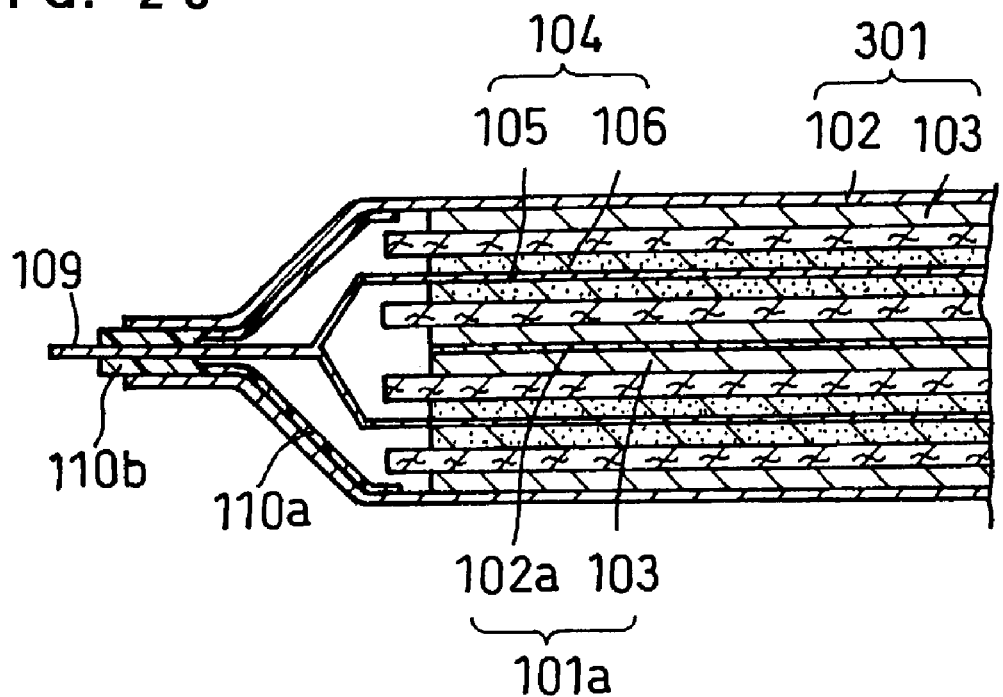
FIG. 20 is another example of a sectional view taken on line I—I in FIG. 14.
Figure 21:
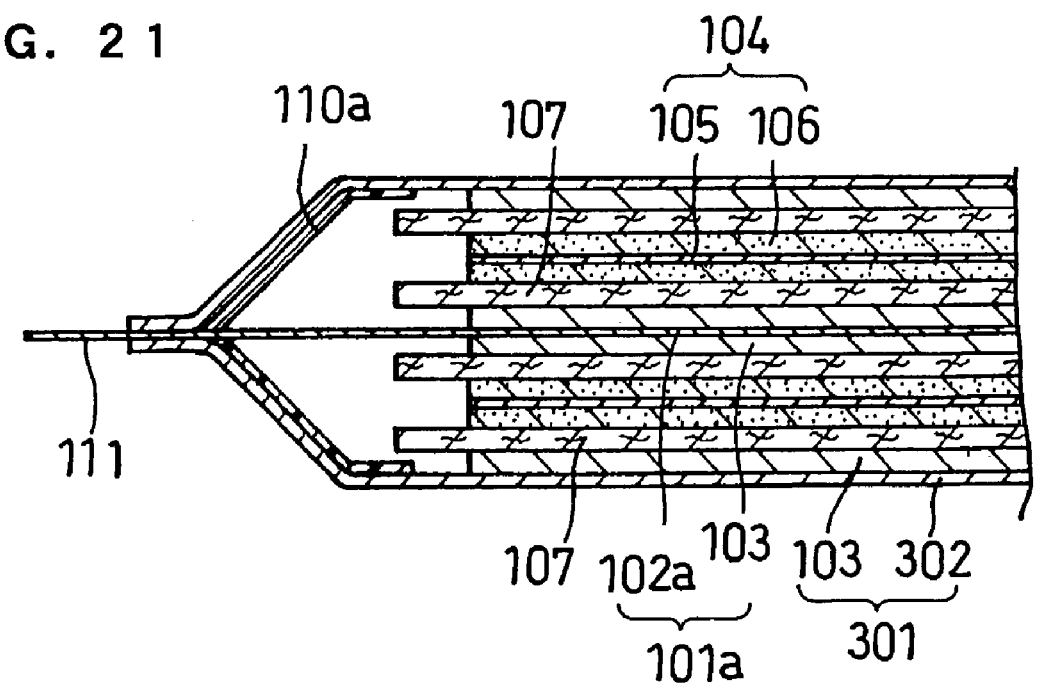
FIG. 21 is another example of a sectional view taken on line II—II in FIG. 14.
Figure 22:
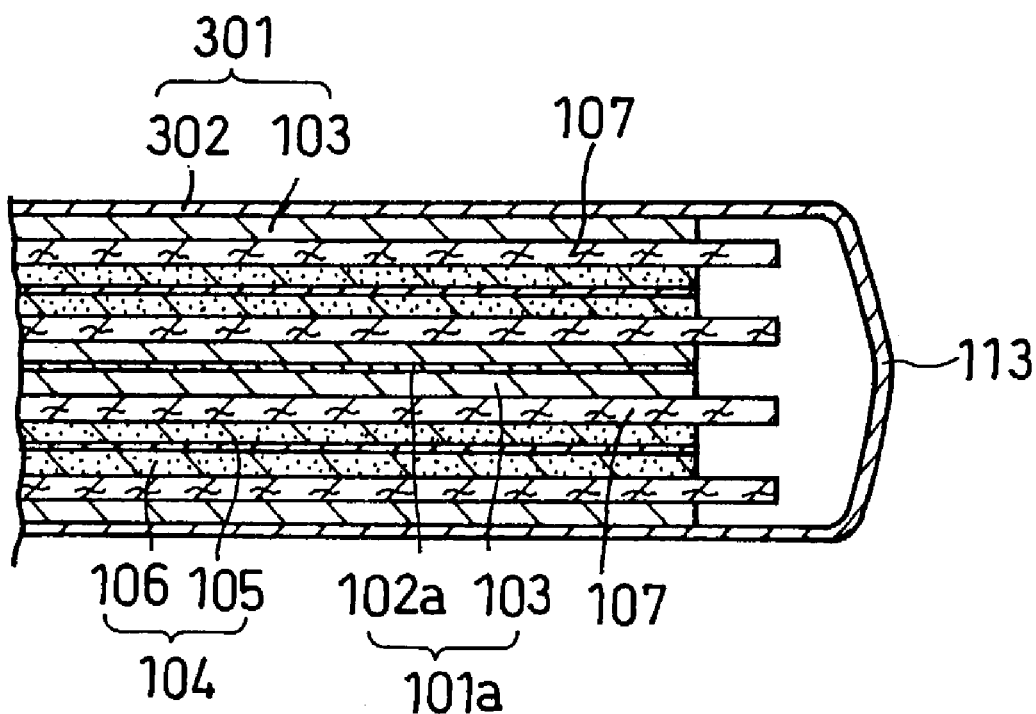
FIG. 22 is another example of a sectional view taken on line III—III in FIG. 14.

FIG. 20, FIG. 21 and FIG. 22 show examples of the sectional views of the battery of Embodiment 7 which have a top plane view shown in FIG. 14, taken on lines I—I, II—II, and III—III, respectively. In FIGS. 20 to 22, components having similar structures or compositions to those of Embodiment 4 or Embodiment 5 are numbered with the same numbers as those of Embodiment 4 or Embodiment 5.

More specifically, this battery further comprises an additional electrode plate of a first polarity 110a disposed adjacent to the electrode plate of a second polarity 104, with a separator layer 107 interposed therebetween; and an additional electrode plate of a second polarity 104 disposed adjacent to the additional electrode plate of a first polarity 110a, with a separator layer 107 interposed therebetween. Although the battery comprising two stacks was shown herein, any number of the electrode plate of a second polarity 104 may be sandwiched by the outer electrode plates of a first polarity 301.

In the following, the present invention is concretely described in detail by referring to examples. It should be noted that each battery described herein is of a flat type of about 10 cm length by 10 cm width.

EXAMPLE 1

In this example, a battery in a single-stacked form as shown in FIG. 1 was fabricated, in which an outer electrode plate serves as a positive electrode.

(i) Production of Outer Electrode Plate

LiCoO$_2$ as a positive electrode active material, carbon powder as a conductive agent, a gel-forming agent, which also served as a binder, and N-methyl-2-pyrrolidone were mixed to give a positive electrode mixture. As the gel-forming agent, a copolymer (hereinafter, referred to as P(VDF-HFP)) comprising 90 wt % of vinylidene fluoride units and 10 wt % of hexafluoropropylene units was used. N-methyl-2-pyrrolidone was used in the ratio of 70 parts by weight with respect to 100 parts by weight of P(VDF-HFP). The weight ratio of the active material: the conductive agent: P(VDF-HFP) was set to be 100:5:8.

A band-shaped, film-type, aluminum current collector having a width of 150 mm and a thickness of 30 μm, was used as a metal sheet. As shown in FIG. 6, at the center of one surface thereof, the positive electrode mixture was intermittently applied in a thickness of 120 μm to successively form a plurality of positive electrode active material layers in the shape of a square of 86×86 mm, thereby producing an outer electrode plate assembly. A spacing of about 17 mm was provided between the positive electrode active material layers.

(ii) Production of Negative Electrode

Graphite powder as a negative electrode material, carbon black as a conductive agent, P(VDF-HFP) and N-methyl-2-pyrrolidone were mixed to give a negative electrode mixture. The weight ratio of the active material: the conductive agent: P(VDF-HFP) was set to be 100:8:14. N-methyl-2-pyrrolidone was used in the ratio of 70 parts by weight with respect to 100 parts by weight of P(VDF-HFP).

A band-shaped, film-type, copper current collector having a width of 150 mm and a thickness of 10 μm, was employed. On both surfaces thereof, the negative electrode mixture was respectively applied in a thickness of 125 μm to form negative electrode active material layers, thereby producing a band-shaped negative electrode plate. From this negative electrode plate, a plurality of negative electrodes in the shape of a square of 88×88 mm were cut out. A nickel lead was connected to the current collector of the negative electrode. The lead was coated with an insulating resin in a part thereof sandwiched between the peripheral portions of the outer electrode plates.

(iii) Production of Electrode Plate Group

As shown in FIG. 7, a separator layer 7 comprising P(VDF-HFP) was formed on each of the positive electrode active material layers of the outer electrode plate assembly. Specifically, the positive electrode active material layer was completely coated with a paste comprising P(VDF-HFP) mixed with N-methyl-2-pyrrolidone and was dried to form a separator layer in the shape of a square of 89×89 mm, having a thickness of about 25 μm.

Next, from the outer electrode plate assembly having a width of 150 mm, the end portions were cut away so as to leave a peripheral portion composed of an exposed metal portion having a width of 7 mm. The peripheral portion of each of the outer electrode plate units was divided into an inner exposed metal portion and an outer exposed metal portion, and a polypropylene film having a thickness of 40 μm, was disposed on the inner one, as an adhesive.

As shown in FIG. 8, a pair of outer electrode plate units was successively disposed such that their positive electrode active material layers faced each other, and a single sheet of the negative electrode was sandwiched by the pair of outer electrode plate units. The electrode plate group thus stacked was successively heated under a pressure of 60 gf/cm$^2$ until the surface temperature thereof reached 120° C., and integrated so as to be flattened, thereby forming an electrode plate group assembly as shown in FIG. 9.

(iv) Joining of Peripheral Portions

The peripheral portions of the electrode plate group assembly were pressed for three seconds at 220±5° C. under 10 kgf/cm$^2$, and joined by melting the polypropylene film interposed between the peripheral portions. However, an unjoined region was reserved for injecting a non-aqueous electrolyte. From the unjoined region, a non-aqueous electrolyte was injected under reduced pressure, and heated to 60° C. or higher to cause the gelation of P(VDF-HFP) in the electrode plate and separator layer.

The above non-aqueous electrolyte was prepared by dissolving LiPF$_6$ at a concentration of 1 mol/L in a mixed solvent of ethylene carbonate and diethyl carbonate with a volume ratio of 1:1.

Thereafter, the pressure inside the battery was reduced and the unjoined region was sealed. This gave an assembly of Batteries B having a completely sealed structure as shown in FIG. 10. The assembly of Batteries B was separated at the end of the process.

Comparative Example 1

The electrode plate group assembly produced in Example 1 was separated into individual electrode plate groups, each of which were then covered by an outer jacket with a thickness of 150 μm comprising an aluminum foil and polypropylene layers on both surfaces thereof. Subsequently, a non-aqueous electrolyte was injected into the outer jacket and heated to 60° C. or higher to cause the gelation of P(VDF-HFP) in the electrode plate and separator layer, followed by sealing the outer jacket. Since the outer electrode plate was also enclosed in the outer jacket by this step, a positive electrode lead was also connected to the outer electrode plate, and the positive electrode lead and the negative electrode lead were drawn from the outer jacket to the outside. This gave Battery A having a sealed structure, which was the equivalent of a conventional product.

EXAMPLE 2

Battery C having a sealed structure was produced in the same manner as in the case of Battery B of Example 1, except that a resin layer comprising polypropylene with a thickness of 50 μm was laminated on an outer surface of the current collector of the outer electrode plate.

EXAMPLE 3

In this example, a battery in a double-stacked form as shown in FIG. 12 was produced, in which the positive electrode served as the outer electrode plate.

(i) Production of Additional Positive Electrode

The same positive electrode mixture as used for the outer electrode plate was applied on both surfaces of a band-shaped, film-type current collector made of aluminum with a width of 150 mm and a thickness of 30 μm to form active material layers having a thickness of 120 μm respectively on both surfaces of the current collector. From the band-shaped electrode plate thus obtained, an additional positive electrode in the shape of a square of 86×86 mm, provided with a lead, was punched out.

(ii) Production of Electrode Plate Group

A paste comprising P(VDF-HFP) mixed with N-methyl-2-pyrrolidone was applied on both surfaces of the additional positive electrode so as to completely cover the positive electrode mixture, and the whole was dried to form a separator layer having a thickness of about 25 μm. The obtained additional positive electrode having the separator layers on both surfaces thereof was sandwiched by two negative electrodes produced in Example 1.

On the other hand, two outer electrode plate assemblies produced in Example 1 were prepared, each outer electrode plate unit of one of the outer electrode plate assemblies and each outer electrode plate unit of the other outer electrode plate assembly were successively disposed such that their positive electrode active material layers faced each other, and the above additional positive electrode sandwiched by the two negative electrodes was sandwiched by a pair of the outer electrode plate units. Then, the thus stacked electrode plate group was heated under a pressure of 60 gf/cm$^2$ 2 until the surface temperature thereof reached 120° C., and integrated so as to be flattened, thereby producing an electrode plate group assembly.

(iii) Joining of Peripheral Portions

The peripheral portions were joined in the same manner as in the case of Battery B, except that the lead of the additional positive electrode was interposed between the peripheral portions of the outer electrode plates and was electrically connected to the outer electrode plate, thereby producing Battery D having a sealed structure.

EXAMPLE 4

In the production step of the outer electrode plate, a spacing of about 9 mm was provided between the positive electrode active material layers, and the end portions of the outer electrode plate assembly having a width of 150 mm was cut away so as to reserve a peripheral portion composed of an exposed metal portion having a width of 3 mm. Then, the peripheral portions facing each other of the outer electrode plates were joined by ultrasonic welding, instead of joining them by an adhesive. Except for the above, Battery E having a sealed structure was produced in the same manner as in the case of Battery B of Example 1. The reason why the width of the peripheral portion to serve as the joined part was reduced to 3 mm was that ultrasonic welding could yield high bonding strength.

EXAMPLE 5

In the production step of the outer electrode plate, a spacing of about 7 mm was provided between the positive electrode active material layers, and the end portions of the outer electrode plate assembly having a width of 150 mm was cut away so as to reserve a peripheral portion composed of an exposed metal portion having a width of 2 mm. Then, the peripheral portions facing each other of the outer electrode plates were joined by laser welding, instead of joining them with an adhesive. Except for the above, Battery F having a sealed structure was produced in the same manner as in the case of Battery B of Example 1. The reason why the width of the peripheral portion to serve as the joined part was reduced to 2 mm was that laser welding could yield a higher bonding strength than ultrasonic welding.

EXAMPLE 6

Battery G was produced in the same manner as in the case of Battery B, except that the outer exposed metal portions of the peripheral portions of the outer electrode plates, where the polypropylene film was not disposed, were joined by laser welding. In the case of Battery G, since the inner exposed metal portions of the peripheral portions were joined by an adhesive and the outer exposed metal portions of the peripheral portions were joined by laser welding, the bonding reliability was improved as compared with Battery B.

EXAMPLE 7

Battery H was produced in the same manner as in the case of Battery B, except that the outer exposed metal portions of the peripheral portions of the outer electrode plates, where the polypropylene film was not disposed, were joined by ultrasonic welding. In the case of Battery H, since the inner exposed metal portions of the peripheral portions were joined by an adhesive and the outer exposed metal portions of the peripheral portions were joined by ultrasonic welding, the bonding reliability was improved as compared with that of Battery B.

EXAMPLE 8

A PTC device having a current breaking temperature of 150° C. was connected to the negative electrode lead which was drawn outside from within the battery. The PTC device was sealed with an insulating resin having resistance to the non-aqueous electrolyte, and sandwiched between the peripheral portions of the outer electrode plates. Except for the above, Battery I having a sealed structure was produced in the same manner as in the case of Battery B of Example 1.

TABLE 1 shows the general structure, the thickness and energy density of the above-described Batteries A to I.

TABLE 1

| Battery | Resin layer on outer surface of outer electrode plate | Number of stack | Battery thickness (mm) | Energy density (Wh/l) |
|---|---|---|---|---|
| A | Present | 1 | 0.9 | 267 |
| B | Not present | 1 | 0.6 | 400 |
| C | Present | 1 | 0.7 | 343 |
| D | Not present | 2 | 1.2 | 400 |
| E | Not present | 1 | 0.6 | 430 |
| F | Not present | 1 | 0.6 | 440 |
| G | Not present | 1 | 0.6 | 400 |
| H | Not present | 1 | 0.6 | 400 |
| I | Not present | 1 | 0.6 | 390 |

The weight reduction rate, capacity retention rate after storage and capacity retention rate after cycles of Batteries A to I were measured in the following manner.

(Weight Reduction Rate)

The battery was charged at 20° C. with a current of 1 C until the battery voltage reached 4.2 V, and thereafter, the charging was continued at a constant voltage until the current reached 0.05 C. Subsequently, the battery at a charged state was stored at 60° C. for 1000 hours. Then, the ratio of the amount of the weight reduction after storage to the weight before storage was determined in percentage. The results are shown in TABLE 2.

(Capacity Retention Rate After Storage)

After being measured for the weight reduction rate, the battery was discharged at 20° C. with a current of 0.2 C. Then, the ratio of the discharge capacity of the battery after storage to the discharge capacity of the battery before storage was determined in percentage. The results are shown in TABLE 2.

(Capacity Retention Rate After Cycles)

The battery was charged at 20° C. with a current of 1 C until the battery voltage reached 4.2 V, and thereafter, the charging was continued at a constant voltage until the current reached 0.05 C. Subsequently, the battery at a charged state was discharged at 20° C. with a current of 1 C until the battery voltage reached 3 V. This operation was repeated 500 times. Then, the ratio of the discharge capacity at the 500th cycle to the discharge capacity at the first cycle was determined in percentage. The results are shown in TABLE 2.

TABLE 2

| Battery | Weight reduction rate (%) | Capacity retention rate after storage (%) | Capacity retention rate after cycles (%) |
|---|---|---|---|
| A | 0.2 | 85 | 85 |
| B | 0.2 | 85 | 85 |
| C | 0.2 | 85 | 85 |
| D | 0.2 | 85 | 85 |
| E | 0.1 | 90 | 87 |
| F | 0.1 | 90 | 87 |
| G | 0.1 | 90 | 88 |
| H | 0.1 | 90 | 87 |
| I | 0.2 | 85 | 85 |

As shown in TABLES 1 and 2, each of the batteries of the present invention has a high energy density, and also exhibits a capacity retention rate after storage and capacity retention rate after cycles which are comparable to or higher than those of the conventional ones. Moreover, it is shown that each of the batteries in which the peripheral portions were joined by welding has a low weight reduction rate and therefore, has high air-tightness. This means that the non-aqueous electrolyte batteries in accordance with the present invention have been remarkably improved in reliability as compared with the conventional ones.

EXAMPLE 9

Battery J having a sealed structure was produced in the same manner as in the case of Battery B of Example 1, except that the peripheral portions of the outer electrode plates were joined by being pressed for three seconds at 220±5° C. and 5 kgf/cm².

EXAMPLE 10

Battery K having a sealed structure was produced in the same manner as in the case of Battery B of Example 1, except that the peripheral portions of the outer electrode plates were joined by being pressed for three seconds at 220±5° C. under 15 kgf/cm².

EXAMPLE 11

Battery L having a sealed structure was produced in the same manner as in the case of Battery B of Example 1, except that the peripheral portions of the outer electrode plates were joined by being pressed for three seconds at 220±5° C. under 20 kgf/cm².

The weight reduction rate, capacity retention rate after storage and capacity retention rate after cycles of the Batteries J to L were measured in the same manner as described above. The results are shown in TABLE 3.

TABLE 3

| Battery | Pressure (Kgf/m²) | Weight reduction rate (%) | Capacity retention rate after storage (%) | Capacity retention rate after cycles (%) |
|---|---|---|---|---|
| B | 10 | 0.2 | 85 | 85 |
| J | 5 | 0.5 | 50 | 30 |
| K | 15 | 0.2 | 85 | 85 |
| L | 20 | 0.35 | 70 | 65 |

In TABLE 3, Battery J, in which the pressure applied to the peripheral portions of the outer electrode plates is as low as 5 kgf/cm², has a high weight reduction rate, and it also has significantly low capacity retention rate after storage and capacity retention rate after cycles. On the other hand, the performance of the battery is remarkably improved, when the pressure applied to the peripheral portions of the outer electrode plates is sufficient, i.e., 10 to 15 kgf/cm². This demonstrates that the battery structure of the present invention has an advantage that the outer electrode plates of the same polarity can be joined together. In other words, in the case of the battery of the present invention in which a minor short circuit is never caused by the joining of the peripheral portions of the outer electrode plates, a sufficient pressure can be applied to the joined portion, thereby markedly improving the reliability of the battery.

It should be noted that the battery performance is poor for Battery L in which the pressure applied to the peripheral portions is 20 kgf/cm². The reason is presumably that the excessively high pressure caused a melt of the polypropylene film to extrude to the outside and thus reduced the reliability of the joined portion.

EXAMPLE 12

Battery M having a sealed structure was produced in the same manner as in the case of Battery B of Example 1, except that the positive electrode active material layer had a thickness of 60 μm and the negative electrode active material layer had a thickness of 65 μm.

EXAMPLE 13

Battery N having a sealed structure was produced in the same manner as in the case of Battery B of Example 1, except that the positive electrode active material layer had a thickness of 270 μm and the negative electrode active material layer had a thickness of 255 μm.

The discharge characteristics of Batteries B, M and N were measured in the following manner.

(2 C/0.2 Ratio)

The battery was charged at 20° C. with a current of 1 C until the battery voltage reached 4.2 V, and thereafter, the charging was continued at a constant voltage until the current reached 0.05 C. Subsequently, the battery at a charged state was discharged at 20° C. with a current of 2 C until the battery voltage reached 3 V.

Then, the battery was charged again at 20° C. with a current of 1 C until the battery voltage reached 4.2 V, and thereafter, the charging was continued at a constant voltage until the current reached 0.05 C. Subsequently, the battery at a charged state was discharged at 20° C. with a current of 0.2 C until the battery voltage reached 3 V.

The ratio of the discharge capacity obtained by the discharging with a current of 2 C to the discharge capacity obtained by the discharging with a current of 0.2 C was determined in percentage. The results are shown in TABLE 4.

(1C/0.2 Ratio)

The battery was charged at 20° C. with a current of 1 C until the battery voltage reached 4.2 V, and thereafter, the charging was continued at a constant voltage until the current reached 0.05 C. Subsequently, the battery at a charged state was discharged at 20° C. with a current of 1 C until the battery voltage reached 3 V.

Then, the battery was charged again at 20° C. with a current of 1 C until the battery voltage reached 4.2 V, and thereafter, the charging was continued at a constant voltage until the current reached 0.05 C. Subsequently, the battery at a charged state was discharged at 20° C. with a current of 0.2 C until the battery voltage reached 3 V.

The ratio of the discharge capacity obtained by the discharging with a current of 1 C to the discharge capacity obtained by the discharging with a current of 0.2 C was determined in percentage. The results are shown in TABLE 4.

TABLE 4

| Battery | Thickness of positive electrode active material layer (μm) | Thickness of negative electrode active material layer (μm) | 2C/0.2C ratio (%) | 1C/0.2C ratio (%) | Capacity retention rate after cycles (%) |
|---|---|---|---|---|---|
| B | 120 | 125 | 90 | 98 | 85 |
| M | 60 | 65 | 96 | 99 | 90 |
| N | 270 | 255 | 40 | 70 | 20 |

TABLE 4 shows that the discharge characteristic, in particular, the high-rate discharge characteristic, decreases with an increase in the thickness of the active material layer. As the means for increasing the discharge capacity of thin batteries, a method has hitherto been adopted, which involves increasing the thickness of the active material layer; however, as shown by the results in TABLE 4, the high-rate discharge characteristic deteriorates with an increase in the thickness of the active material layer. On the other hand, in the case of the batteries of the present invention, the active material layer is divided into two and supported by a pair of the outer electrode plates. Accordingly, there is no need to increase the thickness of the active material layer in order to increase the battery capacity.

EXAMPLE 14

(i) Production of Outer Electrode Plate

LiCoO$_2$ as a positive electrode active material, carbon powder as a conductive agent, P(VDF-HFP) and N-methyl-2-pyrrolidone were mixed to give a positive electrode mixture. The weight ratio of the active material: the conductive agent: P(VDF-HFP) was set to be 100:5:8.

A band-shaped, film-type, aluminum current collector having a width of 200 mm and a thickness of 30 μm, was used as a metal sheet. At the center of the band-shaped metal sheet, a crease line parallel with the longitudinal direction was formed. On one surface of this metal sheet, a resin layer comprising polypropylene with a thickness of 50 μm was laminated, except for its position to be connected to an external terminal.

Subsequently, as shown in FIG. 19, the positive electrode mixture was intermittently applied on the positions, symmetrical with respect to the crease line, of the other surface of the metal sheet to successively form positive electrode active material layers aligned in two rows, thereby producing an outer electrode plate assembly. Each of the positive electrode active material layers thus formed was in the shape of a square of 86 mm×86 mm, having a thickness of 120 μm.

The spacing provided in the row direction between the positive electrode active material layers was 18 mm, and the spacing provided in the width direction was 7 mm, including the crease line.

(ii) Production of Negative Electrode

A negative electrode similar to that of Example 1 was produced.

(iii) Production of Electrode Plate Group

As shown in FIG. 19, a paste comprising P(VDF-HFP) mixed with N-methyl-2-pyrrolidone was successively applied so as to completely cover each of the positive electrode active material layers, which was then dried to form a separator layer in the shape of a square of 89×89 mm, having a thickness of about 25 μm.

Then, a polypropylene film having a width of 5 mm and a thickness of 50 μm was successively disposed as an adhesive so as to surround the two positive electrode active material layers of each of the outer electrode plate units.

Next, the above negative electrode was successively placed on each of the separator layers in one of the rows of the outer electrode plate assembly.

Then, positions to be cut of the outer electrode plate assembly was partly cut off, successively, starting from its junction with the crease line at the center through one end of the current collector, and each of the outer electrode plate units was folded at the crease line. As a result, one of the positive electrode active material layers was placed on the negative electrode with the separator layer interposed therebetween, and the polypropylene films disposed on the peripheral portions of the outer electrode plates faced each other. Thereafter, the electrode plate group thus stacked was successively heated under a pressure of 60 gf/cm$^2$ until its surface temperature reached 120° C., and integrated so as to be flattened.

(iv) Joining of Peripheral Portions

Each of the outer electrode plates was pressed for 3 seconds at 220±5° C. under 10 kgf/cm$^2$ at its peripheral portion, except for the side corresponding to the crease line, and the peripheral portions were joined by melting the polypropylene film. Herein, an unjoined region was reserved for injecting a non-aqueous electrolyte. From the unjoined region, the non-aqueous electrolyte was injected under reduced pressure, and heated to 60° C. or higher to cause the gelation of P(VDF-HFP) in the electrode plate and separator layer. As the non-aqueous electrolyte, the same one as that used in Example 1 was employed. Thereafter, the pressure inside the battery was reduced, and the unjoined region was sealed. As a result, an assembly of Batteries P as shown in FIG. 14 having a completely sealed structure was produced. The assembly of Batteries P was separated at the end of the process.

Thus, Battery P in the shape of a square of 100 mm×96 mm, having a thickness of 0.6 mm, was produced.

EXAMPLE 15

Battery Q in the shape of a square of 95 mm×93 mm, having a thickness of 0.6 mm was produced in the same manner as in Example 14, except that, in the outer electrode plate assembly, the spacing provided in the row direction between the positive electrode active material layers was 12 mm, the spacing provided in the width direction was 7 mm including the crease line, and the peripheral portions of the outer electrode plates were joined by ultrasonic welding, instead of using the polypropylene film.

EXAMPLE 16

Battery R in the shape of a square of 94 mm×92 mm, having a thickness of 0.6 mm was produced in the same manner as in Example 14, except that, in the outer electrode plate assembly, the spacing provided in the row direction between the positive electrode active material layers was 10 mm, the spacing provided in the width direction was 7 mm including the crease line, and the peripheral portions of the outer electrode plates were joined by laser welding, instead of using the polypropylene film.

Comparative Example 2

The electrode plate group assembly produced in Example 1 was separated into individual electrode plate groups. Then, the electrode plate group was covered by an outer jacket with a thickness of 150 μm, comprising an aluminum foil and polypropylene layers on both surfaces thereof. Subsequently, a non-aqueous electrolyte was injected into the outer jacket and heated to 60° C. or higher to cause the gelation of P(VDF-HFP) in the electrode plate and separator layer, followed by sealing the outer jacket. Since the outer electrode plate was also enclosed in the outer jacket by this step, a positive electrode lead was also connected to the outer electrode plate, and the positive electrode lead and the negative electrode lead were drawn from the outer jacket to the outside. This gave Battery S in the shape of a square of 100 mm×96 mm, having a thickness of 0.9 mm.

The weight reduction rate, capacity retention rate after storage and capacity retention rate after cycles of Batteries P to S were measured in the same manner as in the case of Batteries A to L.

The measured results of the weight reduction rate, capacity retention rate after storage and capacity retention rate after cycles of Batteries P to S are shown in TABLE 5, together with the energy density and thickness thereof.

TABLE 5

| Battery | Weight reduction rate (%) | Capacity retention rate after storage (%) | Capacity retention rate after cycles (%) | Energy density (Wh/l) | Battery thickness (mm) |
|---|---|---|---|---|---|
| P | 0.2 | 85 | 85 | 360 | 0.6 |
| Q | 0.2 | 90 | 87 | 390 | 0.6 |
| R | 0.2 | 90 | 87 | 400 | 0.6 |
| S | 0.2 | 85 | 85 | 278 | 0.9 |

As shown in TABLE 5, each of the batteries of the present invention is thin and has a high energy density, and furthermore, it exhibits capacity retention rates comparable to or higher than those of the battery of the comparative Example. Additionally, it is shown that each of the batteries in which the peripheral portions were joined by welding, has a low weight reduction rate and therefore has high air-tightness. This means that the batteries of the present example have been significantly improved in reliability.

Furthermore, it is shown that employing the bending structure, as is done in the present invention, enables reduction of the peripheral portion of the outer electrode plate required for the joining, thereby making it possible to reduce the battery area.

INDUSTRIAL APPLICABILITY

As described above, the present invention provides a high-energy density, thin non-aqueous electrolyte battery which has been reduced in thickness and area as compared with the conventional ones and has a simplified outer jacket structure. The battery in accordance with the present invention is particularly improved in the reliability of the sealed joined portion and in the minor short circuit problem thereof. Furthermore, according to the present invention, a high energy density, thin non-aqueous electrolyte battery having a simplified outer jacket structure can be produced by a continuous process which requires a less number of man-hours.

The invention claimed is:

1. A non-aqueous electrolyte battery comprising:
   an outer jacket comprising a metal sheet and having two primary flat portions facing each other;
   two separate active material layers of a first polarity, each active material layer having a major surface entirely in contact with a respective inner surface of one of said flat portions;
   an electrode plate of a second polarity disposed in a position facing each of said active material layers; and
   a separator layer interposed between each of said active material layers and said electrode plate of a second polarity,
   said outer jacket serving as a current collector of said active material layers.

2. The non-aqueous electrolyte battery in accordance with claim 1, further comprising:
   an additional electrode plate of a first polarity disposed adjacent to said electrode plate of a second polarity with a separator layer interposed therebetween; and an additional electrode plate of a second polarity disposed adjacent to said additional electrode plate of a first polarity with a separator layer interposed therebetween in a double-stacked form.

3. The non-aqueous electrolyte battery in accordance with claim 1, further comprising a lead electrically connected to said electrode plate of a second polarity, one end of said lead protruding outside from said outer jacket, and said lead being insulated from said outer jacket with resin.

4. The non-aqueous electrolyte battery in accordance with claim 3, wherein said lead is provided with an overcurrent breaking device sealed with resin at a portion thereof sandwiched between peripheral portions of said outer jacket.

5. The non-aqueous electrolyte battery in accordance with claim 1, wherein at least one of said separator layer and said active material layers contain a polymer electrolyte.

6. The non-aqueous electrolyte battery in accordance with claim 5, wherein said polymer electrolyte is a gel electrolyte comprising a liquid non-aqueous electrolyte and a polymer retaining the same.

7. The non-aqueous electrolyte battery in accordance with claim 1, wherein said outer jacket comprises a pair of metal sheets having flat portions facing each other or a single metal sheet folded so as to have two flat portions facing each other, and peripheral portions facing each other of said pair of metal sheets or peripheral portions facing each other of said single metal sheet are joined.

8. The non-aqueous electrolyte battery in accordance with claim 7, wherein said peripheral portions facing each other are joined by laser welding or ultrasonic welding.

9. The non-aqueous electrolyte battery in accordance with claim 1, wherein said metal sheet has a thickness of 10 to 100 μm.

* * * * *

UNITED STATES PATENT AND TRADEMARK OFFICE
CERTIFICATE OF CORRECTION

PATENT NO.        : 7,201,997 B2                                          Page 1 of 1
APPLICATION NO.   : 10/240809
DATED             : April 10, 2007
INVENTOR(S)       : Sumihito Ishida et al.

It is certified that error appears in the above-identified patent and that said Letters Patent is hereby corrected as shown below:

Title Page; item

The following Foreign Application Priority Data should be listed on the face page of the patent:

-- Dec. 28, 2000    (JP).................................................2000-403111
       Jan. 29, 2001    (JP).................................................2001-019656
       Mar. 5, 2001    (JP).................................................2001-060873 --.

Signed and Sealed this

Eleventh Day of September, 2007

JON W. DUDAS
*Director of the United States Patent and Trademark Office*